(12) United States Patent
Vasagar

(10) Patent No.: US 9,004,495 B2
(45) Date of Patent: Apr. 14, 2015

(54) SEGMENTED INTERSHAFT SEAL ASSEMBLY

(75) Inventor: Thurai Manik Vasagar, Hatfield, PA (US)

(73) Assignee: Stein Seal Company, Kulpsville, PA (US)

( * ) Notice: Subject to any disclaimer, the term of this patent is extended or adjusted under 35 U.S.C. 154(b) by 0 days.

(21) Appl. No.: 13/527,122

(22) Filed: Jun. 19, 2012

(65) Prior Publication Data

US 2012/0261887 A1 Oct. 18, 2012

Related U.S. Application Data

(63) Continuation-in-part of application No. 12/210,246, filed on Sep. 15, 2008, now Pat. No. 8,205,891.

(51) Int. Cl.
*F01D 11/00* (2006.01)
*F16J 15/44* (2006.01)

(52) U.S. Cl.
CPC .......... *F01D 11/003* (2013.01); *F05D 2250/75* (2013.01); *F05D 2260/38* (2013.01); *F16J 15/441* (2013.01); *F16J 15/442* (2013.01)

(58) Field of Classification Search
USPC .......................... 277/305, 579, 585, 580, 581; 415/173.3, 174.2
See application file for complete search history.

(56) References Cited

U.S. PATENT DOCUMENTS

| | | | |
|---|---|---|---|
| 3,124,502 A * | 3/1964 | Radke | 428/66.4 |
| 4,082,296 A | 4/1978 | Stein | |
| 4,750,746 A * | 6/1988 | Boudot et al. | 277/578 |
| 4,754,984 A | 7/1988 | Keba | |
| 5,603,510 A * | 2/1997 | Sanders | 277/413 |
| 6,070,881 A * | 6/2000 | Longree | 277/409 |
| 6,431,550 B1 * | 8/2002 | Tong | 277/346 |
| 6,547,522 B2 * | 4/2003 | Turnquist et al. | 415/173.3 |
| 6,622,490 B2 * | 9/2003 | Ingistov | 60/782 |
| 6,715,766 B2 * | 4/2004 | Kirby et al. | 277/416 |
| 7,055,826 B2 * | 6/2006 | Stewart, Jr. | 277/358 |
| 7,287,956 B2 * | 10/2007 | Bracken et al. | 415/173.3 |
| 7,291,947 B2 * | 11/2007 | Hashiba et al. | 310/54 |
| 7,344,357 B2 * | 3/2008 | Couture et al. | 415/174.2 |

(Continued)

FOREIGN PATENT DOCUMENTS

| CN | 102348915 A | 2/2012 |
|---|---|---|
| DE | 29510961 U1 | 9/1995 |

(Continued)

*Primary Examiner* — Kristina Fulton
*Assistant Examiner* — Eugene G Byrd
(74) *Attorney, Agent, or Firm* — Michael Crilly, Esquire

(57) ABSTRACT

A segmented intershaft seal assembly for counter-rotating and co-rotating turbine engines is described. The assembly includes a pair of end rings, an annular seal element, and at least one resilient element. At least one end ring has a flange that extends from one side thereof. The flange has a lower annular surface. The seal element includes at least two seal segments. Each seal segment includes a ring segment and a ring flange segment. The ring segment has an upper radial surface. The ring flange segment directly contacts and extends from the upper radial surface forming either a substantially "T"-shaped or "L"-shaped cross section. The seal segments are disposed between the end rings. At least one resilient element biases each seal segment away from the inner shaft so that the upper radial surface contacts the lower annular surface and a portion of the ring flange segment extends beyond the flanges.

23 Claims, 17 Drawing Sheets

(56) References Cited

U.S. PATENT DOCUMENTS

| | | |
|---|---|---|
| 7,726,940 B2 | 6/2010 | Snowsill |
| 7,918,461 B1 * | 4/2011 | MacGregor et al. ........... 277/413 |
| 8,113,771 B2 * | 2/2012 | Turnquist et al. ........... 415/173.3 |
| 8,205,891 B2 * | 6/2012 | Vasagar ........................ 277/585 |
| 8,356,821 B2 * | 1/2013 | Freal et al. .................... 277/581 |
| 2002/0140176 A1 | 10/2002 | Tong |
| 2003/0025273 A1 | 2/2003 | Stewart, Jr. |
| 2003/0131602 A1 | 7/2003 | Ingistov |
| 2005/0206249 A1 * | 9/2005 | Hashiba et al. ................. 310/54 |
| 2007/0053772 A1 * | 3/2007 | Couture et al. ............ 415/173.3 |
| 2007/0090606 A1 * | 4/2007 | Ross et al. ..................... 277/500 |
| 2009/0051124 A1 * | 2/2009 | Kakehi ......................... 277/581 |
| 2010/0066027 A1 | 3/2010 | Vasagar |
| 2010/0164180 A1 | 7/2010 | Short |
| 2012/0243977 A1 * | 9/2012 | Simonet .................... 415/173.3 |

FOREIGN PATENT DOCUMENTS

| | | |
|---|---|---|
| EP | 0382333 A1 | 8/1990 |
| EP | 2341218 A2 | 7/2011 |
| FR | 2602847 A1 | 2/1988 |
| GB | 15792 A | 0/1910 |
| GB | 1565018 A | 4/1980 |

* cited by examiner

SEGMENTED INTERSHAFT SEAL ASSEMBLY

CROSS REFERENCE TO RELATED APPLICATIONS

This application is a continuation-in-part of co-pending U.S. Non-Provisional application Ser. No. 12/210,246 filed Sep. 15, 2008 now allowed for patent. The subject matter of the prior application is incorporated in its entirety herein by reference thereto.

FEDERALLY SPONSORED RESEARCH AND DEVELOPMENT

None.

BACKGROUND OF THE INVENTION

1. Field of the Invention

The invention generally relates to a sealing device for turbine engines. Specifically, the invention is a segmented intershaft seal having a cross section which is generally either T-shaped or L-shaped. Each seal segment is biased in an outward radial direction so as to contact an inner annular surface along one or both end rings disposed about the seal. Seal segments are further seated onto one or both end rings via centrifugal forces and pressures during operation a turbine engine.

2. Background

Applicant describes an intershaft seal for counter-rotating and co-rotating turbine engines in U.S. patent application Ser. No. 12/210,246 and PCT Application Number PCT/US2009/052328. The intershaft seal is a clearance-type seal applicable between inner and outer shafts of a turbine engine. The seal assembly includes a pair of end rings and a seal element. The end rings are secured to an inner shaft. At least one end ring has a flange, with upper and lower surfaces, disposed along and extending from one side of the ring. The seal element includes a ring, with inner and outer surfaces, and a ring flange. The ring flange is disposed along and extends diametrically outward from the outer surface. The seal element is disposed between the end rings so that the ring flange extends beyond the flanges. The outer radial surface of the ring seats with the lower surface along at least one end ring when rotation of the inner shaft imparts an outward centrifugal force onto the seal ring.

The intershaft seal described above minimizes wear and friction induced heat by contacting the inner shaft but not the outer shaft during normal operating conditions; however, heat and thrust induced misalignments between the shafts do occur from time-to-time causing the seal to briefly contact the outer shaft. When contact between the intershaft seal and outer shaft is properly minimized, the weight of the seal is relatively constant during the operational life of the seal. This feature ensures a relatively constant outward centrifugal force which secures the intershaft seal to end rings along the inner shaft when the inner shaft is rotated.

The diameter of an intershaft seal is often constrained by manufacturing considerations. In one example, the uniformity and consistency of material properties is inversely related to the size of the material stock, examples including a sheet, bar, or block, from which the seal ring is fabricated. This means that larger diameter seal rings are inherently less uniform mechanically and thermally when manufactured from a single, large material stock. In other example, material and manufacturing costs increase with the size of the material stock. Materials costs increase with stock size by virtue of the raw material, processing, and handling costs. Manufacturing costs increase with stock size because of the equipment required to handle and properly machine a seal to proscribed tolerances and the waste or scrap associated with unused portions of the stock material. In yet another example, manufacturability decreases inversely with stock size because of the difficulties associated with holding proscribed tolerances and avoiding warp and other manufacturing induced defects which may or may not be related to imperfections or inconsistencies within the stock material.

One solution is to construct a large diameter intershaft seal from two or more segments which interlock to form a single ring structure whereby each seal segment is manufactured from a separate, smaller, more uniform, and less costly material stock. However, this approach is problematic for the intershaft seal described above because the seal, by virtue of its design and function, is unsupported before centrifugal forces cause it to move radially outward to seat onto flanges along the end rings. The result is a segmented seal which is difficult to properly assemble within a turbine engine and difficult to properly control below the centrifugal forces and pressures which secure the seal ring to the end rings.

Accordingly, what is required is a segmented intershaft seal capable of replicating the performance characteristics of a non-segmented intershaft seal in large diameter applications while avoiding the problems inherent to these applications.

SUMMARY OF THE INVENTION

An object of the invention is to provide a segmented intershaft seal capable of replicating the performance characteristics of a non-segmented intershaft seal in large diameter applications while avoiding the problems inherent to these applications.

In accordance with embodiments of the invention, the segmented intershaft seal assembly includes a pair of end rings, an annular seal element, and at least one resilient element. At least one end ring has a flange which is disposed along and extends from one side of the end ring. The flange further includes a lower annular surface. The annular seal element includes at least two seal segments. Each seal segment includes a ring segment and a ring flange segment. The ring segment is wider than the ring flange segment so as to form either a substantially "T"-shaped cross section or a substantially "L"-shaped cross section. Each ring segment has an upper radial surface. The ring flange segment is disposed along and extends from the upper radial surface. At least one resilient element biases each seal segment away from the inner shaft so that the upper radial surface directly contacts a portion of the lower annular surface so that a portion of the ring flange segments extends beyond the flange.

In accordance with other embodiments of the invention, the resilient element is a compression spring, a flat spring, or an extension spring.

In accordance with other embodiments of the invention, the resilient element is partially recessed within each seal segment.

In accordance with other embodiments of the invention, a spacer ring is disposed between the end rings and directly contacts the inner shaft and the resilient element is partially recessed within the spacer ring.

In accordance with other embodiments of the invention, at least two pins are separately secured to the spacer ring. Each pin partially resides within an oversized cavity along a seal segment. The oversized cavity is dimensioned to minimize contact between the pin and the seal segment when the seal segment is displaced by direct contact with the outer shaft.

In accordance with other embodiments of the invention, the seal segments are mechanically secure to at least one end ring.

In accordance with other embodiments of the invention, at least two pins are separately secured to at least one end ring. Each pin partially resides within a slot-shaped cavity. The slot-shaped cavity is oriented radially outward to minimize contact between the pin and the seal segment when the seal segment is displaced by direct contact with the outer shaft.

In accordance with other embodiments of the invention, each ring flange segment has a convex-shaped surface adjacent to an outer shaft.

In accordance with yet other embodiments of the invention, a locking nut directly contacts one end ring to secure the seal assembly to an inner shaft.

In accordance with other embodiments of the invention, seal segments are composed of a metal, a metal alloy, or a carbon. The end rings, inner shaft, and outer shaft have substantially similar thermal expansion properties to minimize contact between the seal segments and outer shaft.

Several advantages are offered by the invention. The invention avoids the wear caused by relative axial movement between the seal element and end ring faces. The invention avoids wear along the outer diameter of the seal ring caused by translations between the inner and outer shafts. The invention avoids friction induced heating along the seal element, via a substantially non-wearable sealing system, allowing the seal element to be composed of a metal, metal alloy, or carbon graphite, thereby reducing the cost of the seal system. The combination of a segmented seal and resilient elements disposed between a pair of end rings allows for localized and limited deflection of the seal thereby minimizing damage to the segmented seal during excursions between the inner and outer shafts which result in contact of the seal by the outer shaft. The oversized cavities within the seal segments further minimize damage to the segmented seal by providing adequate clearance to allow the segments to move radially without contacting the anti-rotation pin during excursions between the inner and outer shafts which result in contact of the seal by the outer shaft. The seal is properly seated on a structure attached to the inner shaft at the onset of rotation further minimizing mass loss and variation in the centrifugal forces acting on the segment seal. Centrifugal forces further secure the seal element to the inner shaft during rotation.

The above and other objectives, features, and advantages of the preferred embodiments of the invention will become apparent from the following description read in connection with the accompanying drawings, in which like reference numerals designate the same or similar elements.

| REFERENCE NUMERALS |
| --- |
| 11 Seal assembly |
| 12 Seal element |
| 13 End ring |
| 14 End ring |
| 15 Locking ring |
| 16 Spacer ring |
| 17 Gap |
| 18 Flange |
| 19 Inner shaft |
| 20 Outer shaft |
| 21 Flange |
| 22 Gap |
| 23 Centerline |
| 24 Ring |
| 25 Ring flange |

| REFERENCE NUMERALS |
| --- |
| 26 Inner surface |
| 27 First outer surface |
| 28 Second outer surface |
| 29 Lower surface |
| 30 Lower surface |
| 31 Gap |
| 32 Cavity |
| 33 Cavity |
| 34 Anti-rotation pin |
| 35 Roll pin |
| 36 End ring |
| 37 Relief |
| 38 Seal element |
| 39 Upper surface |
| 40 Clearance |
| 41 Joint |
| 42 Inner surface |
| 43 Joint |
| 44 Gap |
| 45 Upper surface |
| 46 Upper surface |
| 47 Mechanical stop |
| 48 Spring |
| 49 Groove |
| 50a, 50b Step |
| 51a, 51b Step |
| 52 Inner diameter |
| 53 Intermediate ring |
| 54 Annular seal element |
| 55 Ring segment |
| 56 Ring flange segment |
| 57 Seal segment |
| 58 Compression spring |
| 59 Spacer ring |
| 60 Cavity |
| 61 Anti-rotation pin |
| 62 Cavity |
| 63 End ring |
| 64 End ring |
| 65 Flange |
| 66 Support surface |
| 67 Support surface |
| 68 Annular gap |
| 69 Upper radial surface |
| 70 Lower annular surface |
| 71 Cavity |
| 72 Roll pin |
| 73 Cavity |
| 74 Flange |
| 75 Flange |
| 76 Cavity |
| 77 Cavity |
| 78 Anti-rotation pin |
| 79 Cavity |
| 80 Notch |
| 81 Flat spring |
| 82 Groove |
| 83 Extension spring |
| 84 Anti-rotation pin |
| 85 Inner radial Surface |
| 86 Outer annular surface |
| 87 Corner |
| 88 End |

BRIEF DESCRIPTION OF THE DRAWINGS

Additional aspects, features, and advantages of the invention will be understood and will become more readily apparent when the invention is considered in the light of the following description made in conjunction with the accompanying drawings.

DETAILED DESCRIPTION OF THE INVENTION

Figure 1:
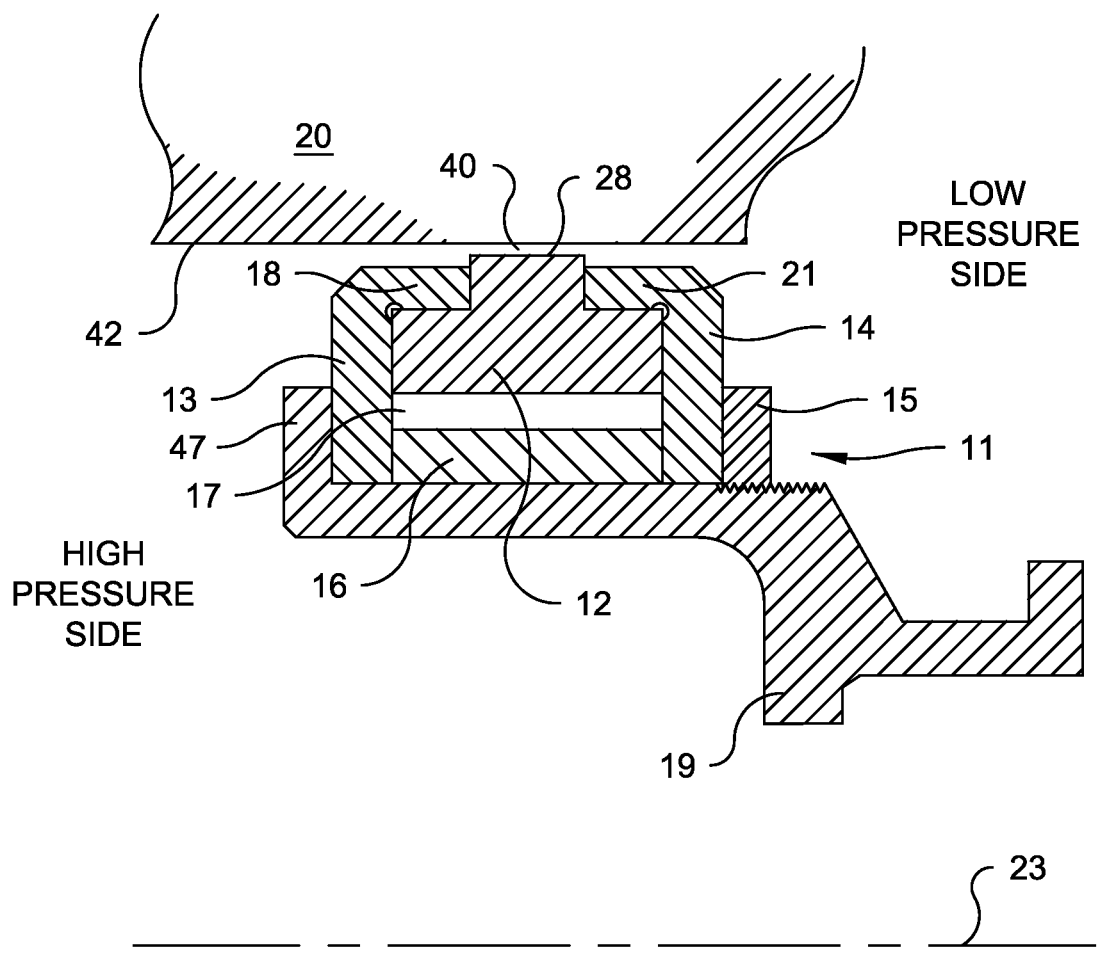
FIG. 1 is a cross-sectional view illustrating a seal assembly disposed between a pair of rotating shafts in accordance with an embodiment of the invention.

Reference will now be made in detail to several embodiments of the invention that are illustrated in the accompanying drawings. Wherever possible, same or similar reference numerals are used in the drawings and the description to refer to the same or like parts. The drawings are in simplified form and are not to precise scale.

While features of various embodiments are separately described throughout this document, it is understood that two or more such features could be combined into a single embodiment.

It is also understood that the various embodiments of the seal assembly are shown in enlarged view for descriptive purposes and that all such embodiments are applicable to a turbine engine with inner and outer shafts as generally described in FIG. 1.

As represented in FIG. 1, the seal assembly 11 is shown including a pair of end rings 13, 14, a seal element 12, an optional gap 17, an optional spacer ring 16, and an optional locking ring 15 disposed between an inner shaft 19 and an outer shaft 20. Elements are disposed about a common centerline 23 or axis-of-rotation. A clearance 40 is provided between the inner surface 42 along the outer shaft 20 and a second outer surface 28 along the seal element 12. The height of the clearance 40 should be sufficient to avoid contact between the outer shaft 20 and seal element 12 and to minimize fluid leakage across the seal element 12. Inner shaft 19 and outer shaft 20 are structures understood in the art which rotate in either a counter-rotational or co-rotational fashion.

Each end ring 13 and 14 includes a flange 18 and 21, respectively, so as to have a substantially L-shaped cross section. End rings 13, 14 are disposed in a substantially symmetrical arrangement about the seal element 12 and contact the inner shaft 19 so that the flanges 18, 21 are arranged immediately adjacent to but do not contact the outer shaft 20. This arrangement forms a structure having a generally inverted T-shaped cross section which complements the cross-sectional design of the seal element 12.

The seal assembly 11 is designed so as to rotate with the inner shaft 19. One end ring 13 could be secured to the inner shaft 19 via a mechanical stop 47 and the other end ring 14 could be secured via a locking ring 15 threaded, pinned, other otherwise fastened or secured onto the inner shaft 19. It is likewise possible for both end rings 13, 14 to be secured to the inner shaft 19 via a pair of locking rings 15 separately disposed at the ends of the seal assembly 11. It is further possible for one end ring 13 or 14 to be an integral or unitary part of the inner shaft 19. Also, the seal assembly 11 could include a variety of stacking arrangements including additional spacers or the like which contact or are immediately adjacent to the locking ring 15.

The seal element 12 is disposed between and could contact the end rings 13, 14. A spacer ring 16 having an overall diameter less than the seal element 12 also resides between the end rings 13, 14. In preferred embodiments, the outer diameter of the spacer ring 16 is less than the inner diameter of the seal element 12 so as to provide a gap 17 between the elements. The radial height of the gap 17 is preferred to be dimensioned so as to avoid contact between the inner diameter of the seal element 12 and the outer diameter of the spacer ring 16 during excursions of the inner and outer shafts 19, 20. Seal element 12 and/or spacer ring 16 could contact both end rings 13, 14.

The seal assembly 11 avoids the problems of temperature and load capacity associated with many fluid-film seals. The seal element 12 is a piston ring with a gap and a cross-sectional profile with an inverted T-shape. The seal element 12 has an interior flange that mates with the end rings 13, 14 attached to the inner shaft 19. Centrifugal force drives the seal element 12 against the overhang of the end rings 13, 14 and causes the seal element 12 to rotate with the inner shaft 19. Leakage occurs across a controlled clearance at the outer diameter of the seal element 12.

The advantage of this design is its simplicity and avoidance of fluid-film problems. Since there is no relative movement between the seal element 12 and mating components, the seal element 12 minimizes wear. Materials comprising the end rings 13, 14, spacer ring 16, inner shaft 19, and outer shaft 20 are selected to have substantially similar thermal expansion properties to ensure the clearance 40 between the outer diameter of the seal element 12 and the inner diameter of the outer shaft 20 is closely controlled. Exemplary materials include, but are not limited to, metal, metal alloys, and carbon. The clearance 40 could dynamically vary because of the relative movement between the inner and outer shafts 19, 20.

Figure 2:
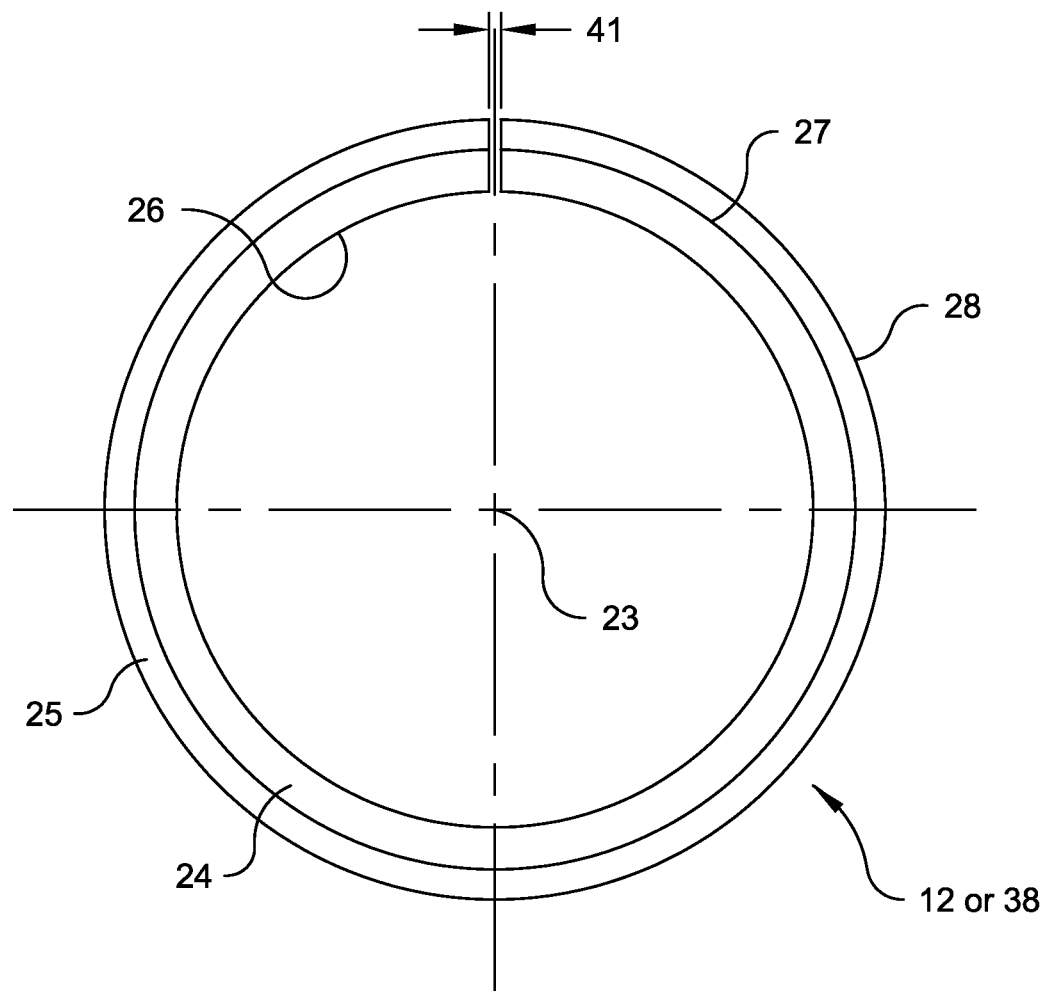
FIG. 2 is a side elevation view illustrating a seal element with a single joint in accordance with an embodiment of the invention.

As represented in FIG. 2, the seal element 12, 38 is comprised of a ring 24 and a ring flange 25 disposed about a common centerline 23. The ring 24 is a substantially circular element of uniform thickness with a generally square or rectangular cross section between an inner surface 26 and a first outer surface 27. The ring flange 25 is a substantially circular structure which extends from the first outer surface 27 along the ring 24. The ring flange 25 could have a substantially square or rectangular cross section. The cross-sectional width of the ring flange 25 is less than the corresponding dimension along the ring 24, as represented in FIGS. 3 and 4.

Figure 3:
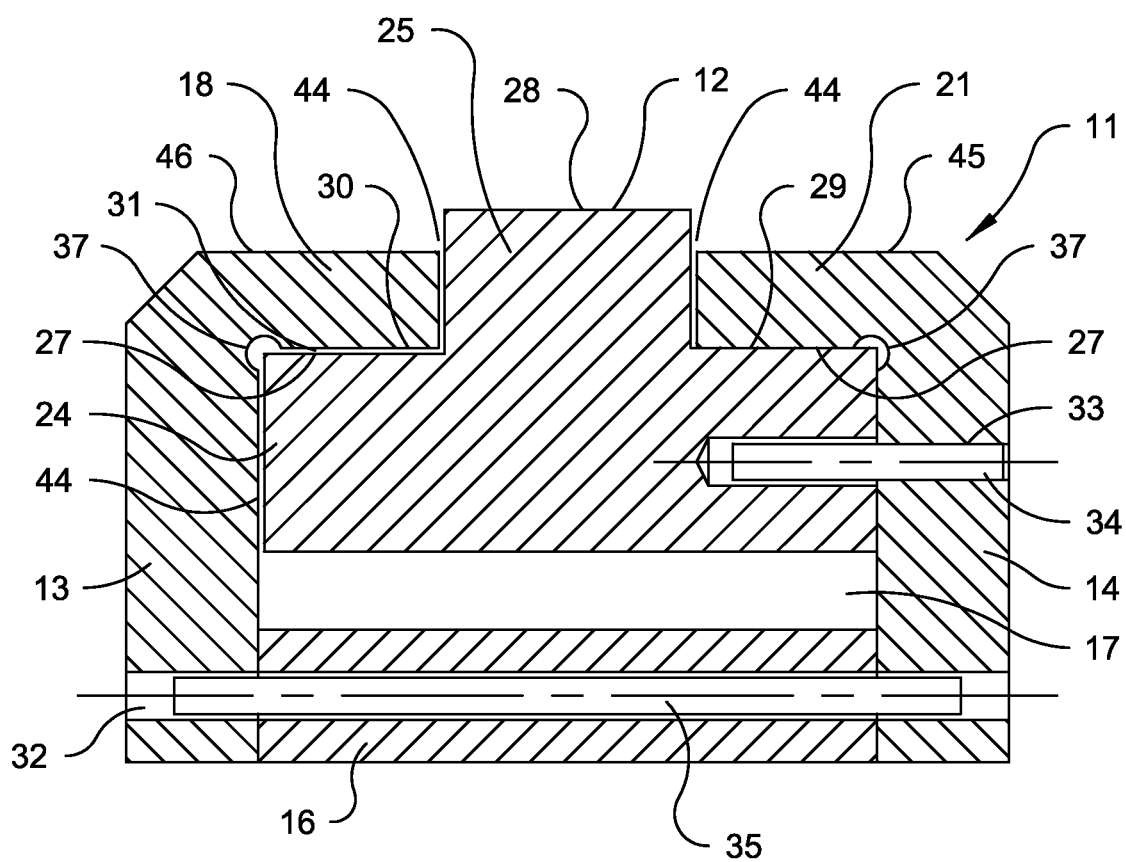
FIG. 3 is an enlarged cross-sectional view illustrating a seal assembly with an inverted generally T-shaped seal element in accordance with an embodiment of the invention.

In some embodiments, the ring flange 25 is located along the ring 24 in a symmetric or non-symmetric arrangement to form a substantially inverted T-shaped cross section, as represented in FIG. 3. The stepwise cross section of the T-shaped seal element 12 provides a single second outer surface 28, corresponding to the outer diameter of the ring flange 25, disposed between a pair of first outer surfaces 27, corresponding to the interface between the outer diameter of the ring 24 and inner diameter of the ring flange 25.

Figure 4:
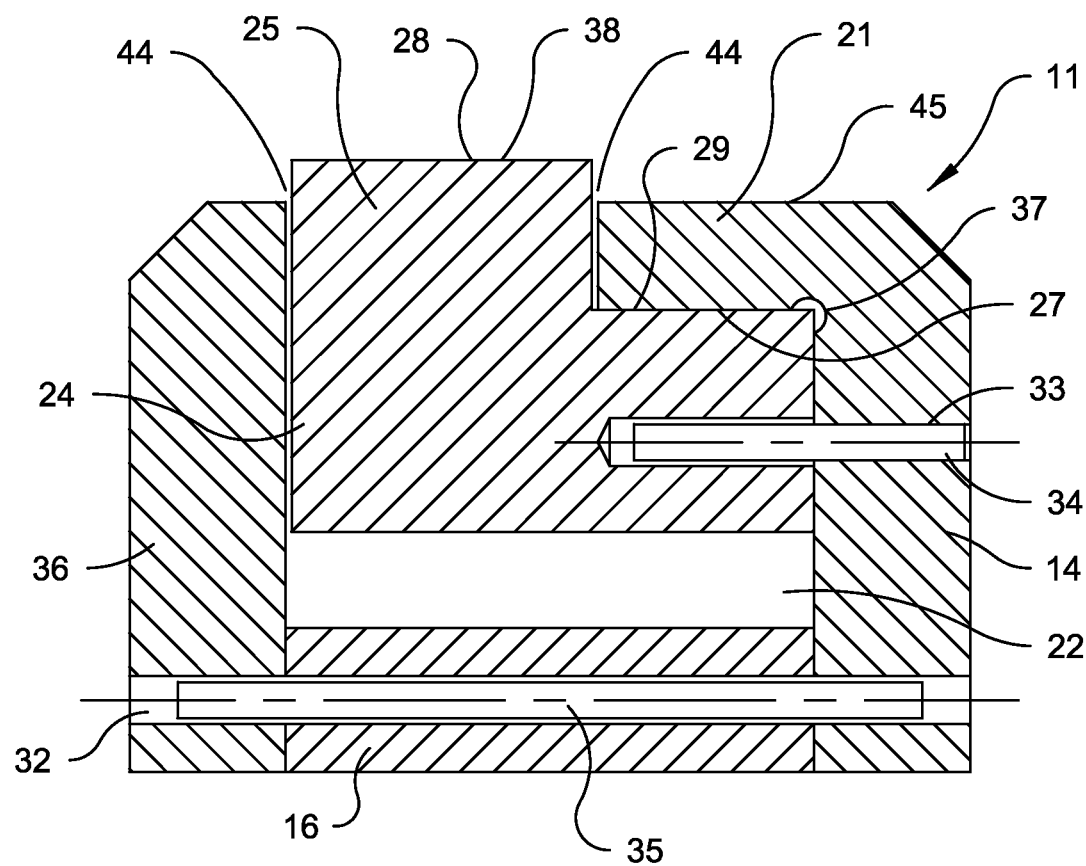
FIG. 4 is an enlarged cross-sectional view illustrating a seal assembly with a generally L-shaped seal element in accordance with an embodiment of the invention.

In other embodiments, the ring flange 25 is positioned at one end of the ring 24 to a form a substantially L-shaped cross section, as represented in FIG. 4. The stepwise cross section of the L-shaped seal element 38 provides a single first outer surface 27, along the interface between the outer diameter of the ring 24 and inner diameter of the ring flange 25, and a single second outer surface 28, along the outer diameter of the ring flange 25.

In preferred embodiments, ring 24 and ring flange 25 are manufactured via methods understood in the art from a single or monolithic structure. However, it is possible for the ring 24 and ring flange 25 to be separately manufactured and assembled via methods understood in the art to form the seal element 12.

In some embodiments, the seal element 12 or 38 could include at least one joint 41 which partially or completely transverses the cross section of the element, the latter arrangement allowing the seal element 12, 38 to open outward as centrifugal forces push the seal element 12, 38 against one or both flanges 18, 21 to seat the seal element 12, 38 thereto. In other embodiments, the seal element 12, 38 could include two or more such joints 41 facilitating a segmented rather than continuous seal element 12, 38.

Figure 7A:
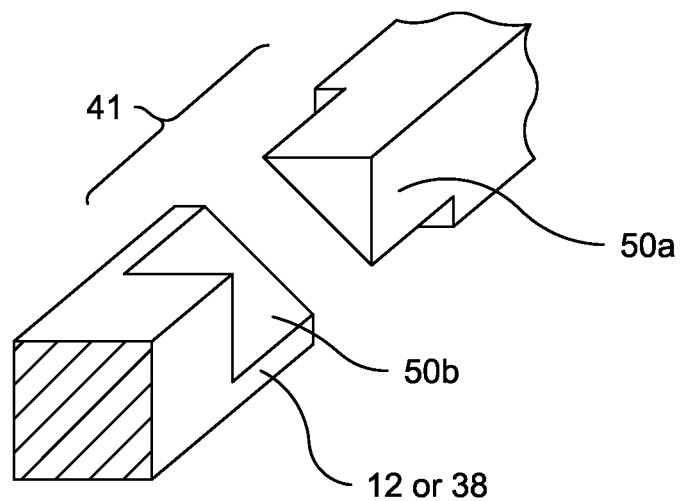
FIG. 7a is an enlarged perspective view illustrating a step joint formed by interlocking wedge-shaped steps in accordance with an embodiment of the invention.
Figure 7B:
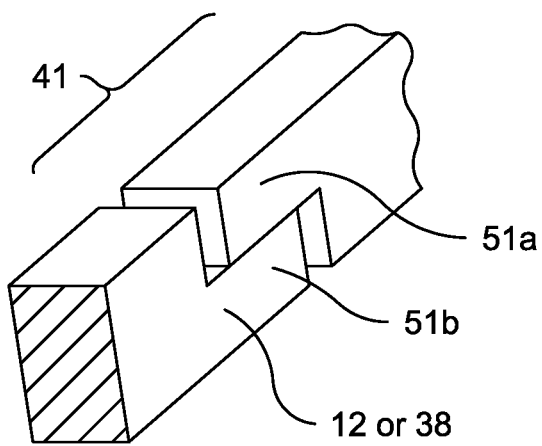
FIG. 7b is an enlarged perspective view illustrating a step joint formed by interlocking rectangular-shaped steps in accordance with an embodiment of the invention.

Joints 41 could include a variety of structures understood in the art. For example, FIG. 2 shows a straight cut joint. In another example, FIG. 7a shows a tongue/groove joint 41 including a pair of wedge-shaped steps 50a, 50b which interlock to minimize leakage across the joint 41. In yet another example, FIG. 7b shows a tongue/groove joint 41 including a pair of rectangular-shaped steps 51a, 51b which also interlock to minimize leakage across the joint 41. Steps 50a, 50b or 51a, 51b are disposed along the seal element 12 or 38 and could traverse the ring 24 and/or the ring flange 25 structures described herein.

As represented in FIG. 3, the seal assembly 11 is shown for a seal element 12 with a generally inverted T-shaped cross section. The seal element 12 is disposed between the end rings 13, 14 so that the ring 24 is bounded by the end rings 13, 14. The ring flange 25 is disposed between the flanges 18, 21 so as to at least extend in a radial fashion beyond the upper surfaces 46, 45 of both flanges 18, 21, respectively.

In some embodiments, it is preferred to include a gap 44, disposed between one or both flanges 18, 21 and the vertical walls of the ring flange 25, to ensure that the seal element 12 floats inside the seal assembly 11 and has sufficient radial motion to properly adjust with thermal effects. In other embodiments, a gap 44 could be disposed between adjacent vertical walls along the ring 24 and one end ring 13. In yet other embodiments, a gap 31 could be disposed between lower surface 30 along one flange 18 and the first outer surface 27 along the ring 24. In still other embodiments, at least one first outer surface 27 should contact the lower surface 29 along the flange 21, because of manufacturing tolerance variations along the outer surfaces 27 of the ring 24 and lower surfaces 29 of the flanges 18, 21. In preferred embodiments, no gap 31 is present when components are precision machined so that the upper surfaces 29, 30 of the end rings 13, 14 and first outer surface 27 of the ring 24 are dimensionally identical.

In some embodiments, a spacer ring 16 is provided between the end rings 13, 14 so as to contact the outer surface of the inner shaft 19. One or more cavities 32 could traverse the spacer ring 16 about its circumference and one or both end rings 13, 14. Roll pins 35 and cavities 32 are complementary shaped so as to allow a roll pin 35 to be inserted into each cavity 32. Each cavity 32 along the end rings 13, 14 could be dimensioned to form an interference fit with a roll pin 35, while the cavity 32 through the spacer ring 16 could provide an interference or clearance fit. The roll pins 35 secure the seal element 12, end rings 13, 14, and spacer ring 16 so as to form a cartridge-like assembly.

In other embodiments, the spacer ring 16 could be spaced apart from the seal element 12 via a gap 17 of circular extent. The gap 17 should have sufficient radial height to accommodate the relative radial motion of the seal element 12 about the cavity 33 because of the clearance fit of the anti-rotation pin 34.

In preferred embodiments, there is no relative movement between the seal element 12 and other components comprising the seal assembly 11. One or more cavities 33 could completely or partially traverse the seal element 12 about its circumference and one or both end rings 13, 14. Anti-rotation pins 34 and cavities 33 are shaped so as to allow an anti-rotation pin 34 to be inserted into each cavity 33

Each anti-rotation pin 34 could be press fitted onto the end ring 14 by providing an interference fit between the anti-rotation pin 34 and cavity 33 along the thickness of the end ring 14. However, the cavity 33 portion through the seal element 12 should be larger than the diameter of the anti-rotation pin 34 so as to allow the seal element 12 to slide or move axially and radially in response to mechanical and thermal effects to avoid binding along the seal element 12. For example, the cavity 33 portion through the seal element 12 could be either circular or slot-shaped. If movement of the seal element 12 is overly restricted due to inadequate clearance between the diameter of the cavity 33 along the seal element 12 and the diameter of anti-rotation pin 34 therein, the first outer surface 27 along the seal element 12 will not follow and seat onto the lower surface 29 of the flange 21. The result could be an unsteady condition without uniform radial support along the seal element 12 by the flanges 18, 21, potentially causing the seal element 12 to crack or explode. Other anti-rotation elements and approaches known within the art are applicable.

Each end ring 13, 14 is preferred to include a relief 37 disposed in a circumferential arrangement at the intersection of the horizontal flange 18, 21 with the vertical structure of each ring, so as to avoid stress concentrations within the end rings 13, 14 and fit and wear problems with the seal element 12. The relief 37 could be a radius, if space constraints preclude a relief 37. For example, a chamfer could be included at the interfaces of the first outer surface 27 and the vertical face of the ring 24.

Figure 8A:
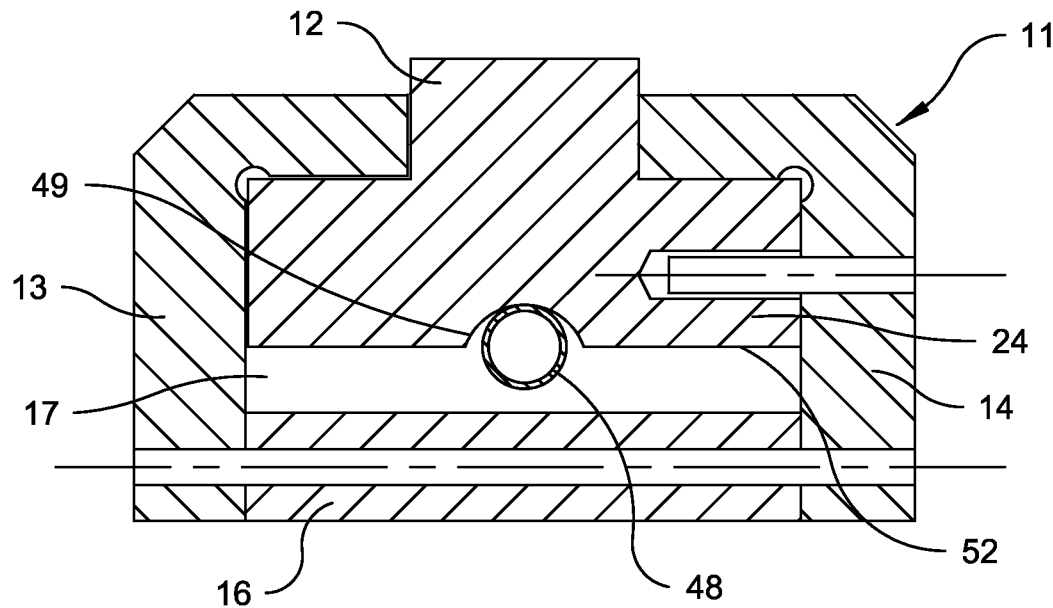
FIG. 8a is an enlarged cross-sectional view illustrating a T-shaped seal element having a spring disposed along the inner diameter thereof in accordance with an embodiment of the invention.
Figure 8B:
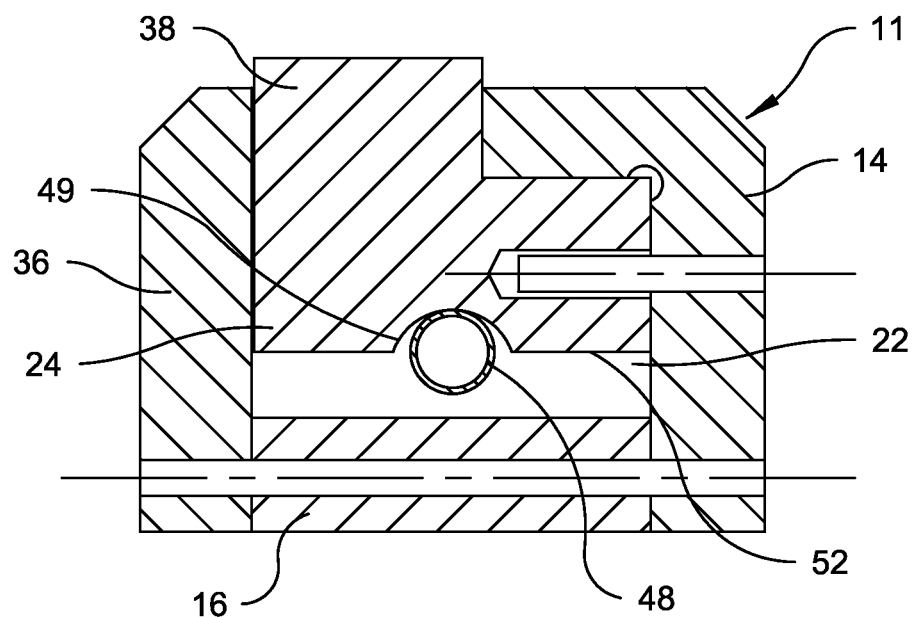
FIG. 8b is an enlarged cross-sectional view illustrating an L-shaped seal element having a spring disposed along the inner diameter thereof in accordance with an embodiment of the invention.

As represented in FIGS. 1-3, the left hand side of the seal assembly 11 is the high pressure side. When pressure is introduced, the seal element 12 seats onto the low pressure side of the end ring 14. The joint 41 includes a space which is compressed when the seal element 12 is assembled to form a seal assembly 11. Also, the first outer surface 27 seats and seals onto the lower surface 29. If the tension along the seal element 12 is inadequate to radially seat the first outer surface 27 against lower surface 29, an expander spring 48 could be used along the inner diameter of the seal element 12, as shown in FIGS. 8a and 8b. During operation of the inner and outer shafts 19, 20, centrifugal force seats the seal element 12 as the inner shaft 19 rotates; however, the tension described herein is required along the seal element 12 in order to properly seat the seal element 12 when the inner shaft 19 is stationary.

By selecting materials with coefficient of thermal expansion rates which are sufficiently similar, it is possible for the end rings 13, 14, spacer ring 16, inner shaft 19, and outer shaft 20 to expand and contract at similar rates. When the lower surface 29 expands, the first outer surface 27 follows the lower surface 29 because of the centrifugal force produced by the rotating inner shaft 19. The joint 41 opens to accommodate diametrical changes along the lower surface 29 caused by thermal effects, thus closely maintaining the clearance 40 shown in FIG. 1 between the outer diameter of the seal element 12 and inner diameter of the outer shaft 20.

As represented in FIGS. 1, 3 and 4, the gap 17, 22 should be sufficiently large to accommodate thermally-induced expansion variations along the inner diameter of the seal element 12, 38. The segment of the cavity 33 within the seal element 12, 38 is sized to likewise accommodate thermally-induced expansion variations along the seal element 12, 38. Accordingly, the size and shape of the cavity 33 within the seal element 12, 38 could differ from the portion of the cavity 33 disposed along the end ring 14. Furthermore, the clearance 40 in FIG. 1 is well defined, since the outer shaft 20 should not contact the seal element 12, 38. The end rings 13, 14 restrict radial movement of the seal element 12 and 38, thus avoiding the radial excursions possible with other seal designs.

As represented in FIG. 4, the seal assembly 11 from FIG. 3 is shown having a seal element 38 with a generally L-shaped cross section composed of a ring 24 and ring flange 25. The seal element 38 is disposed between a generally planar-shaped end ring 36 and an L-shaped end ring 14 so that the ring 24 is bounded by both end rings 14, 36. The ring flange 25 is disposed between the end ring 36 and a flange 21 extending from the second end ring 14 so as to at least extend in a radial fashion beyond the upper surface 45 of the flange 21.

In some embodiments, it is preferred to include a gap 44, disposed between the vertical sides of flange 21 and/or the end ring 36 and the vertical walls of the ring flange 25, to ensure that the seal element 38 floats inside the seal assembly 11 and has sufficient radial motion to properly adjust to thermal effects. The first outer surface 27 should contact the lower surface 29 along the flange 21.

In other embodiments, a spacer ring 16 is provided between the end rings 14, 36 so as to contact the outer surface of the inner shaft 19. One or more cavities 32 could traverse the spacer ring 16 about its circumference and one or both end rings 14, 36. Roll pins 35 and cavities 32 are complementary shaped so as to allow a roll pin 35 to be inserted into each cavity 32. The roll pins 35 secure the seal element 38, end rings 14, 36, and spacer ring 16 so as to form a cartridge-like assembly, providing a structure which is readily shippable and handle-able. Each cavity 32 along the end rings 14, 36 could provide an interference fit with the roll pin 35, while the cavity 32 along the spacer ring 16 could provide either an interference or clearance fit.

In yet other embodiments, the spacer ring 16 could be separated from the seal element 38 via a gap 22 of circular extent. The gap 22 should have sufficient radial height to accommodate the relative radial motion of the seal element 38 about the cavity 33 because of the clearance fit of the anti-rotation pin 34.

In preferred embodiments, there is no relative movement between the seal element 38 and other components comprising the seal assembly 11. One or more cavities 33 could completely or partially traverse the seal element 38 about its circumference and one or both end rings 14, 36. Anti-rotation pins 34 and cavities 33 are shaped so as to allow an anti-rotation pin 34 to be inserted into each cavity 33. However, other anti-rotation elements and approaches known within the art are likewise applicable to the embodiments described herein.

Each anti-rotation pin 34 should be press fitted onto the end ring 14 by providing an interference fit between anti-rotation pin 34 and cavity 33 along the thickness of the end ring 14. However, the cavity 33 portion along the seal element 38 should be larger than the diameter of the anti-rotation pin 34 so as to allow the seal element 38 to slide or move axially and radially in response to mechanical and thermal effects without binding the seal element 12. For example, the cavity 33 along the seal element 38 could be either circular or slot-shaped. If movement of the seal element 38 is overly restricted due to inadequate clearance between the diameter of the cavity 33 along the seal element 12 and the diameter of anti-rotation pin 34 therein, the first outer surface 27 along the seal element 38 would not follow and seat onto the lower surface 29 of the flange 21, as described herein.

The end ring 14 is preferred to include a relief 37 disposed in a circumferential arrangement at the intersection of the horizontal flange 21 with the vertical structure of the end ring 14, so as to avoid stress concentrations therein and fit and wear problems with the seal element 38. The relief 37 could include a radius depending on space constraints.

In some embodiments, it might be advantageous for seal and/or wear purposes to include a non-linear profile along the second outer surface 28 of the seal elements 12, 38 shown in FIGS. 3 and 4, respectively.

Figure 5:
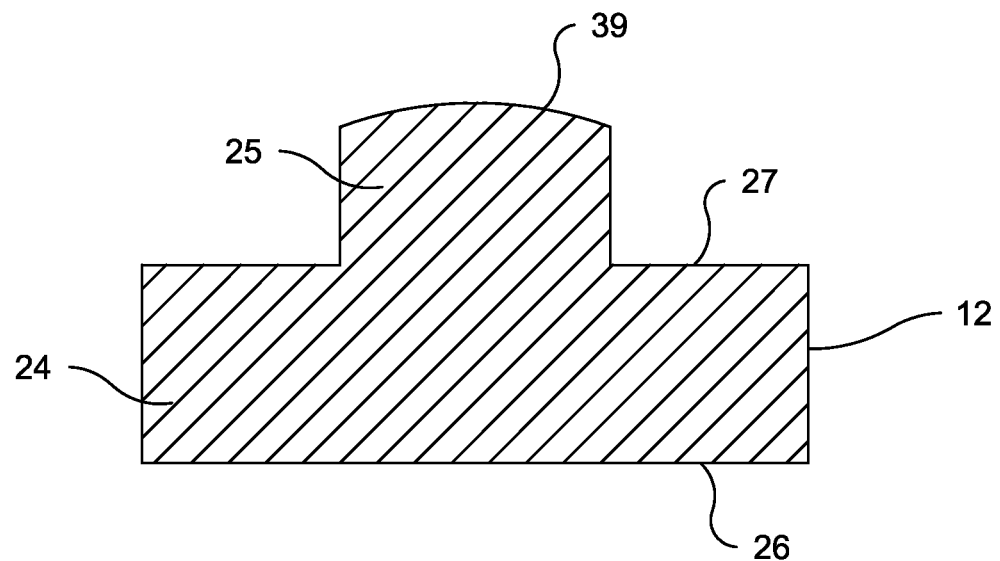
FIG. 5 is an enlarged cross-sectional view illustrating an inverted and generally T-shaped seal element with contoured surface upper surface in accordance with an embodiment of the invention.

Referring now to FIG. 5, an inverted T-shaped seal element 12 is shown having a generally concave-shaped upper surface 39 along the ring flange 25. Remaining features of the ring 24, namely, first outer surface 27 and inner surface 26 are as described herein.

Figure 6:
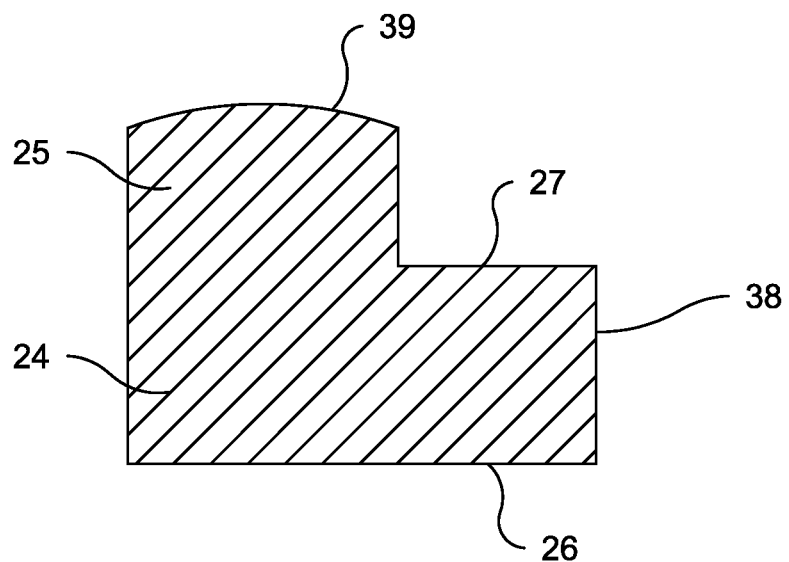
FIG. 6 is an enlarged cross-sectional view illustrating a generally L-shaped seal element with contoured upper surface in accordance with an embodiment of the invention.

As represented in FIG. 6, an L-shaped seal element 38 is shown having a generally concave-shaped upper surface 39 along the ring flange 25. Remaining features of the ring 24, namely, first outer surface 27 and inner surface 26 are as described herein.

Other contoured geometries composed of one or more concave, convex, and/or linear segments are likewise possible along the upper surface 39. The upper surface 39 could be molded onto or machined or shaped into an otherwise linear profile along the outermost diametrical surface of a seal element 12, 38.

In other embodiments, it might be advantageous for seal and/or wear purposes to include a spring 48 along the seal elements 12 and 38 shown in FIGS. 8a and 8b, respectively. For example, FIGS. 8a and 8b show a spring 48 disposed along a groove 49 about the inner diameter 52 of the inverted T-shaped seal element 12 and L-shaped seal element 38, respectively. The spring 48 could be a garter spring, expander spring, or the like. The groove 49 is a semi-circular structure disposed along the seal element 12, 38 which approximates the curvature of the spring 48. The spring 48 imparts a radial force to seat the outer surface 27 of the seal element 12, 38 onto the lower surfaces 29 and/or 30 as the inner shaft 19 rotates. In other embodiments, the spring 48 could exert an outward radial force onto the seal element 12, 38 when the seal element 12, 38 is stationary.

Figure 9:
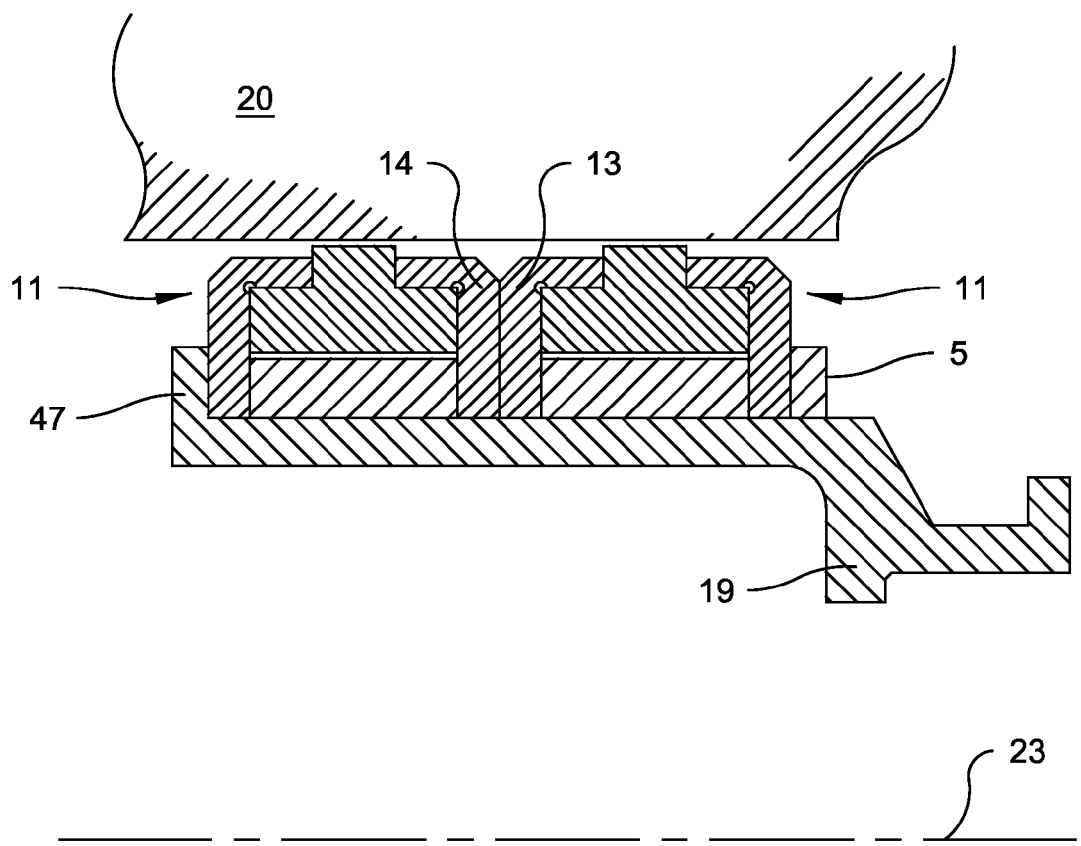
FIG. 9 is a cross-sectional view illustrating a serial arrangement of seal assemblies disposed between an inner shaft and an outer shaft in accordance with an embodiment of the invention.
Figure 10:
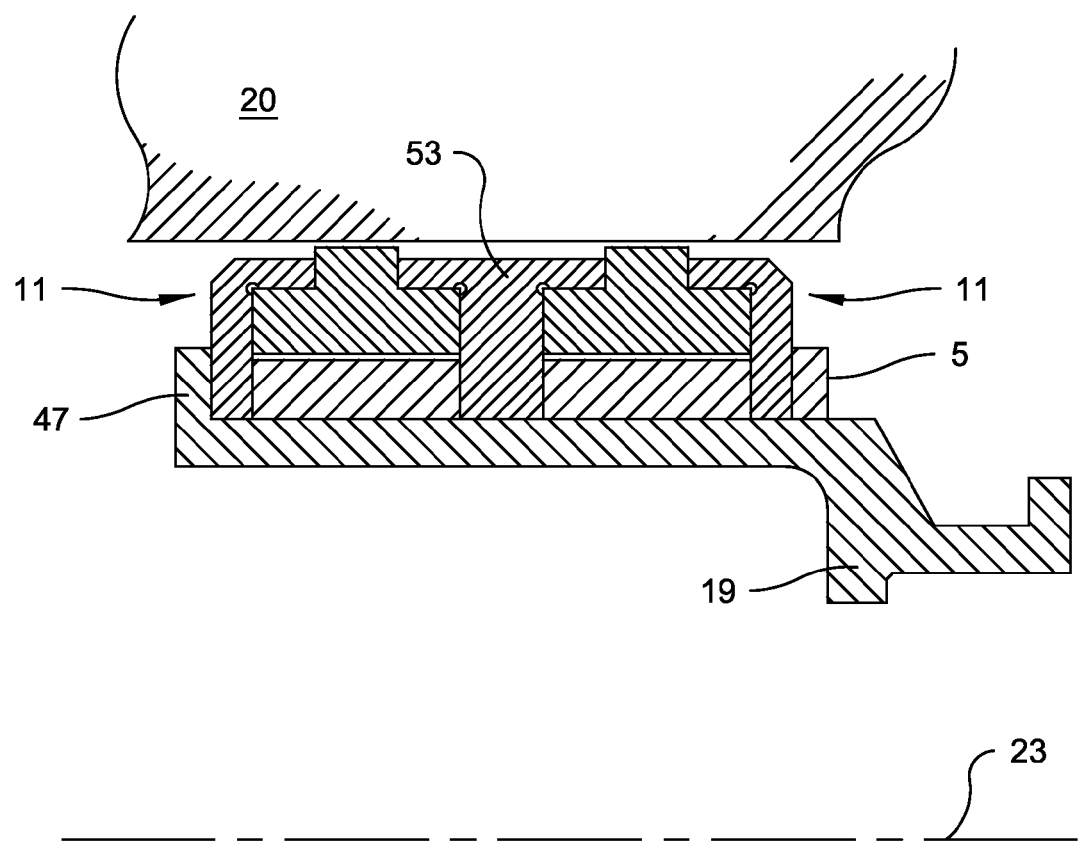
FIG. 10 is a cross-sectional view illustrating a serial arrangement of seal assemblies with a single intermediate ring disposed between an inner shaft and an outer shaft in accordance with an embodiment of the invention.

As represented in FIGS. 9 and 10, it might be advantageous to arrange two or more seal assemblies 11, comprised of T-shaped seal elements 12 and/or L-shaped seal elements 38 described herein, in a stacked or serial fashion between an inner shaft 19 and an outer shaft 20. Seal assemblies 11 could be secured to the inner shaft 19 between a mechanical stop 47 and a locking ring 5, however other arrangements are possible. The total number of seal assemblies 11 is dependent on the space constraints along the inner shaft 19. In FIG. 9, the seal assemblies 11 are constructed as described herein. In FIG. 10, the innermost end rings 14, 13 identified in FIG. 9 are replaced by a single intermediate ring 53 having a generally T-shaped cross section. Both multi-seal assemblies reduce the total flow of air across the seal system.

The seal elements 12, 38 described herein could be composed of high-temperature, carbon-graphite compositions known within the art. An advantage of carbon-graphite is its ability to wear without damage, unlike metals, when the relative movement between the inner and outer shafts 19, 20 exceeds the clearance 40 shown in FIG. 1. However, the invention described herein also allows for the use of high-temperature metal and metal alloys because the seal assembly 11 avoids the wear problems associated with dual-shaft systems. Exemplary metal and metal alloys could include, but are not limited to, 17-4 PH, 410 SS, titanium, and Inconel-X® (the registered trademark of the Huntington Alloys Corporation of Huntington, W. Va.). Metals further allow the matching of thermal expansion coefficients for materials composing the inner and outer shafts 19, 20, seal element 12 or 38, and end rings 13, 14 or 14, 36.

Figure 11:
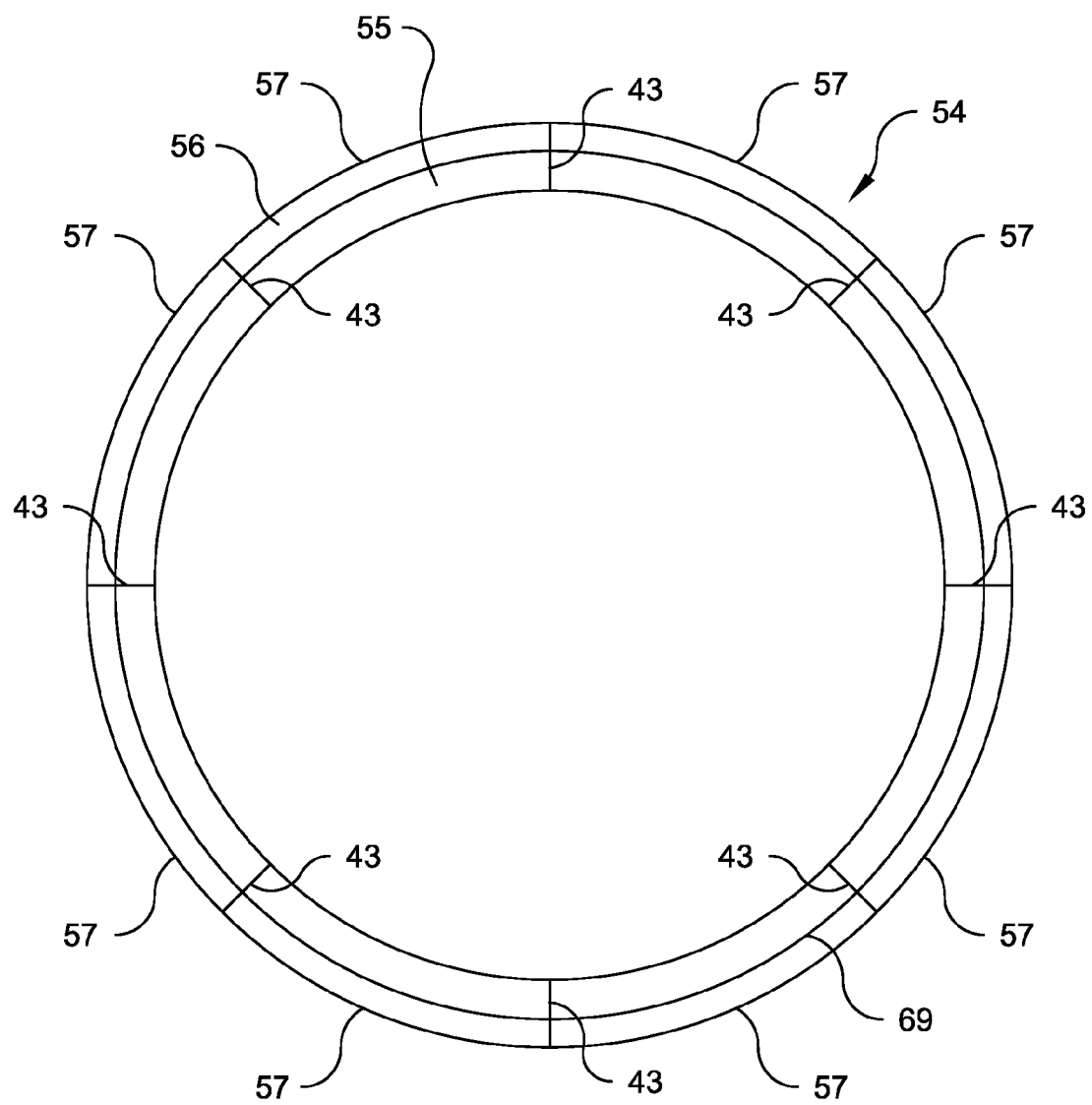
FIG. 11 is a side elevation view illustrating a segmented intershaft seal with multiple joints in accordance with an embodiment of the invention.

Referring now to FIG. 11, the annular seal element 54 is shown including a plurality of joints 43 forming an equal number of separate seal segments 57. Although FIG. 11 shows eight joints 43 and eight seal segments 57, it is understood that the annular seal element 54 could include two or more joints 43 and an equal number of seal segments 57. Each seal segment 57 is generally arc shaped. A complete set of seal segments 57 forms a circular ring-shaped structure. In preferred embodiments, the seal segments 57 are approximately the same size and weight so as to properly balance the seal assembly 11. In some embodiments, a joint 43 could include the tongue and groove features described in FIGS. 7a and 7b. In other embodiments, each joint 43 could be a planar cut which locally traverses the annular seal element 54. The latter joint type is permissible in large diameter seal designs because joint leakage is generally more tolerable. While reference is made to a segmented annular seal element 54, end rings 63, 64 and spacer ring 59 are not segmented.

Figure 12C:
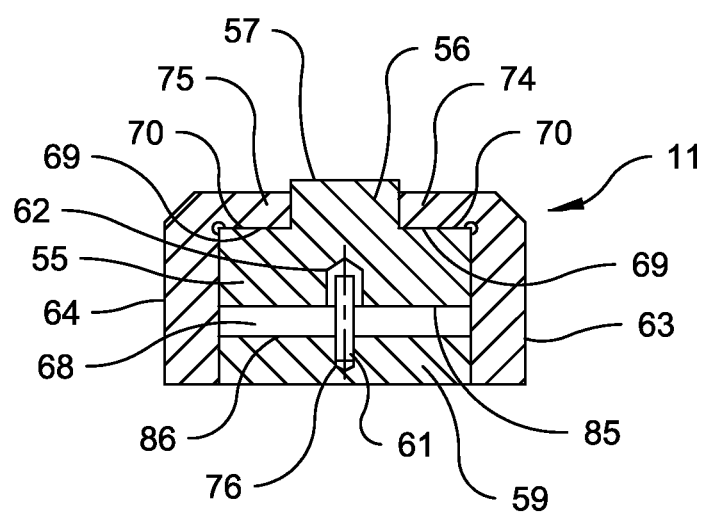
FIG. 12c is an enlarged cross-sectional view of the seal segments in FIGS. 12a and 12b illustrating a seal assembly whereby the seal segment has a generally T-shaped cross section and the optional pin is secured to the spacer ring and resides within an oversized cavity within the seal segment in accordance with an embodiment of the invention.
Figure 13:
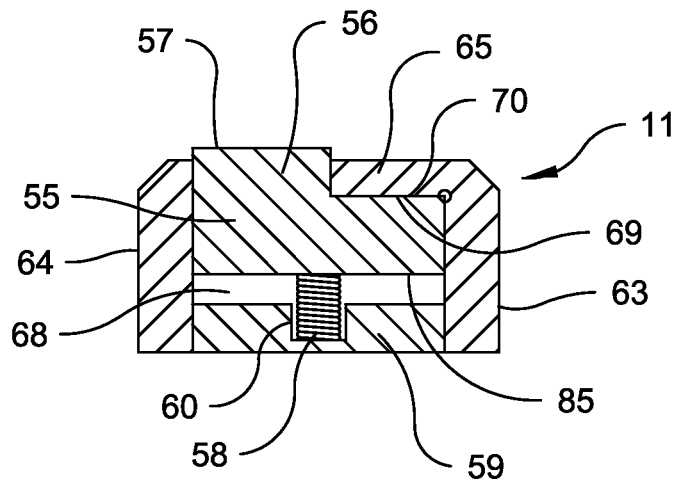
FIG. 13 is an enlarged cross-sectional view illustrating a seal assembly whereby a seal segment has a generally L-shaped cross section and a compression spring is partially recessed within a spacer ring and contacts an inner radial surface along the seal segment in accordance with an embodiment of the invention.

Each seal segment 57 further includes a ring segment 55 and a ring flange segment 56. Each ring segment 55 is arc shaped with a generally quadrilateral cross section. Each ring flange segment 56 is also arc shaped with a generally quadrilateral cross section. A ring flange segment 56 is disposed along and extends from the upper radial surface 69 of a ring segment 55 so as to form a structure with either a "T"-shaped cross section or an "L"-shaped cross section, as generally represented in FIGS. 12c and 13 respectively. In some embodiments, the upper radial surface 69 of the ring flange segment 56 could be convex shaped, as represented in FIGS. 5 and 6.

Figure 12A:
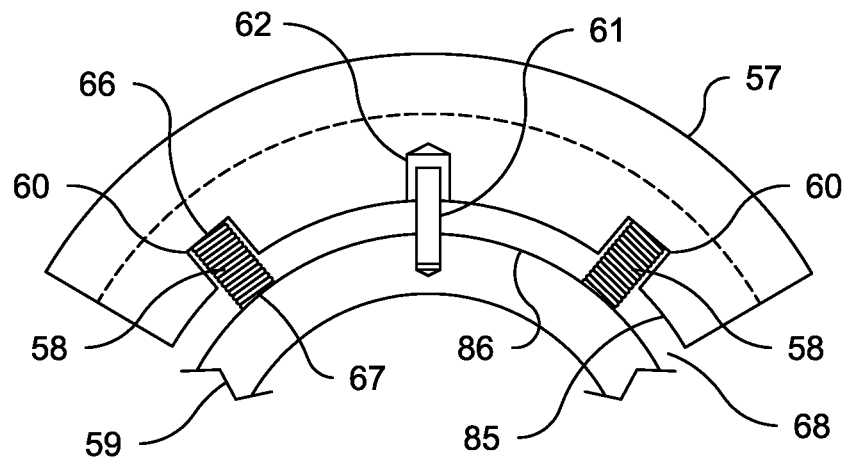
FIG. 12a is a cross-sectional elevation view illustrating a pair of compression springs and an optional pin disposed between a seal segment and a spacer ring whereby the compression springs are partially recessed within the seal segment in accordance with an embodiment of the invention.
Figure 12B:
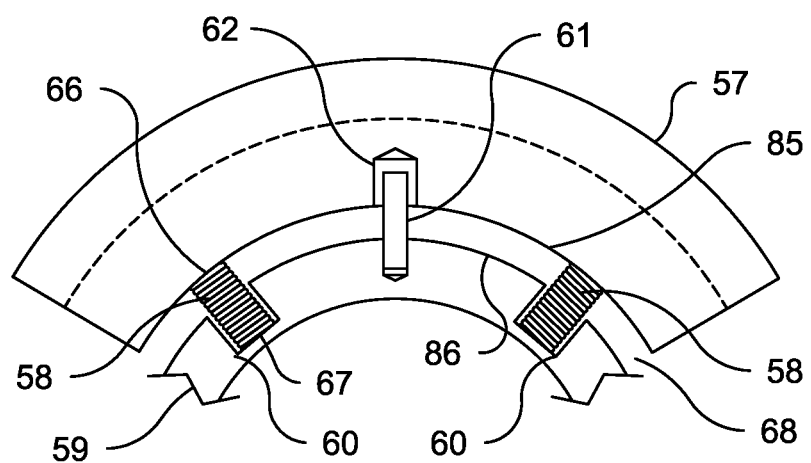
FIG. 12b is a cross-sectional elevation view illustrating a pair of compression springs and an optional pin disposed between a seal segment and a spacer ring whereby the compression springs are partially recessed within the spacer ring in accordance with an embodiment of the invention.

Referring now to FIGS. 12a and 12b, a seal segment 57 is shown disposed about a spacer ring 59 with an annular gap 68 there between. The spacer ring 59 could contact the outer diameter of an inner shaft 19, the latter feature described in FIG. 1. A pair of resilient elements or compression springs 58 could be disposed between the seal segment 57 and spacer ring 59 and oriented to apply a spring force onto the seal segment 57 and the spacer ring 59. One non-limiting example of a compression spring 58 is a coil spring.

In some embodiments, it might be possible to support each seal segment 57 with one compression spring 58 depending on the length of the seal segment 57 and other design considerations. In other embodiments, each compression spring 58 could be partially recessed within a cavity 60 along an inner radial surface 85 of the seal segment 57, as represented in FIG. 12a. In this arrangement, each compression spring 58 applies a force onto a support surface 66 at the bottom of the cavity 60 and onto a support surface 67 disposed along the outer annular surface 86. In other embodiments, each compression spring 58 could be partially recessed within a cavity 60 along outer annular surface 86 of the spacer ring 59, as represented in FIG. 12b. In this arrangement, each compression spring 58 applies a force onto a support surface 66 along the inner radial surface 85 of the seal segment 57 and onto a support surface 67 at the bottom of the cavity 60. A cavity 60 could be a cylindrical-shaped hole which approximates the cross section of the compression spring 58. The cavity 60 could be dimensioned for a clearance fit with the compression spring 58; however, an interference fit might be advantageous in some applications.

Referring now to FIGS. 12a-12c, the seal segment 57 and spacer ring 59 are shown disposed between a pair of end rings 63, 64. In this embodiment, the seal segment 57 has an inverted "T"-shaped cross section and each end ring 63, 64 includes a flange 74, 75, respectively. The spacer ring 59 is wider than the ring segment 55 so as to provide at least a clearance fit between the seal segment 57 and the interior vertical surfaces of the end rings 63, 64. This arrangement allows at least one side of the seal segment 57 to avoid contact with the interior vertical surfaces of one or both end rings 63, 64 and/or flanges 74, 75 or 65, as generally represented by the gap 44 in FIGS. 3 and 4.

The compression springs 58 should bias the seal segment 57 away from the spacer ring 59 so as to enable contact between the upper radial surface 69 along the ring segment 55 and the lower annular surface 70 along the flanges 74, 75 in FIG. 12c and flange 65 in FIG. 13. The compression springs 58 should also be sufficiently elastic and deformable so as to allow the seal segment 57 to move radially inward toward the spacer ring 59 when a contact force is applied onto the seal segment 57 by the outer shaft 20 (not shown). Finally, the compression springs 58 should be sufficiently resilient so as to recover their original shape thereby reseating the seal segment 57 against the flanges 65, 74, 75. At least one compression springs 58 could be used with each seal segment 57.

The fully extended length of a compression spring 58 should at least ensure that the upper radial surface 69 along a ring segment 55 contacts the lower annular surface 70 along a flange 74, 75 or 65. In these such embodiments, the uncompressed height of the compression spring 58 would be approximately equal to either the distance between the support surfaces 66, 67 when the upper radial surface 69 contacts the lower annular surface 70 or the total of the height of the annular gap 68 and the depth of the cavity 60.

In preferred embodiments, the fully-extended length of the compression spring 58 should be greater than the total of the height of the annular gap 68 and the depth of the cavity 60 so that a positive contact force is applied along the interface between the upper radial surface 69 and lower annular surface 70. The applied force is design dependent, yet should be sufficient to prevent or minimize sliding between the seal segment 57 and flanges 74, 75 or 65. In all embodiments, the ring flange segment 56 should extend above the flanges 74, 75 or 65. This feature requires the height of the ring flange segment 56 to exceed the maximum thickness of the flanges 74, 75 or 65, as represented in at least FIGS. 12c and 13, respectively.

In some embodiments, one or more anti-rotation pins 61 could be secured to the spacer ring 59 in an outward radial arrangement, as represented in FIGS. 12a-12c. Each anti-rotation pin 61 could be partially recessed within and mechanically attached to a cavity 76, which complements the shape of the pin 61, via threads or an interference fit or adhesively secured thereto. The remaining portion of each anti-rotation pins 61 should extend radially outward so as to traverse the annular gap 68 and partially penetrate a cavity 62 along the inner radial surface 85 of the seal segment 57.

From time-to-time, axial alignment between the inner and outer shafts 19, 20 (see FIG. 1) will deviate due to mechanical and thermal conditions. Large deviations may be sufficient to enable the outer shaft 20 to contact a portion of one or more ring flange segments 56 extending above the flanges 74, 75. The cavity 62 could be dimensionally oversized for the anti-rotation pin 61 so as to avoid or minimize contact with the seal segment 57. In this regard, the distance between the depth of the cavity 62 and the length of the anti-rotation pin 61 residing with the cavity 62 should be at least the maximum radial translation possible when the outer shaft 20 interacts with the seal segment 57. In one example, the maximum radial translation could be equivalent to the difference between the height of the compression spring 58 within the seal assembly 11 and the height of the compression spring 58 when fully compressed. In another example, the maximum radial translation could be equivalent to the compression distance allowed for the compression spring 58 when less than the maximum allowable compression. The distance between the radius of the cavity 62 and the radius of the anti-rotation pin 61 could define the maximum axial translation. In one example, the maximum axial translation could be equivalent to twice the average width of a gap or translation distance at two or more joint 43. In another example, the maximum axial translation could be a fraction of the maximum radial translation to account for compound translations.

Referring now to FIG. 13, a seal segment 57, an annular gap 68, and a spacer ring 59 are shown disposed between a pair of end rings 63, 64. In this embodiment, the seal segment 57 has an "L"-shaped cross section so only one end ring 63 includes a flange 65 allowing contact between a lower annular surface 70 and an upper radial surface 69. A compression spring 58 is partially recessed within a cavity 60 along the spacer ring 59 and further contacts the inner radial surface 85 of the seal segment 57. It is likewise possible for the compression spring 58 to be partially recessed within the seal segment 57 as otherwise described herein. While the compression spring 58 is shown equidistant between the vertical walls of the end rings 63, 64, it might be advantageous in certain applications to bias the spring toward one end ring 63 or 64 either to maximize the contact force between the upper radial surface 69 and the lower annular surface 70 or to minimize twist of the seal segment 57 within the seal assembly 11.

Figure 14:
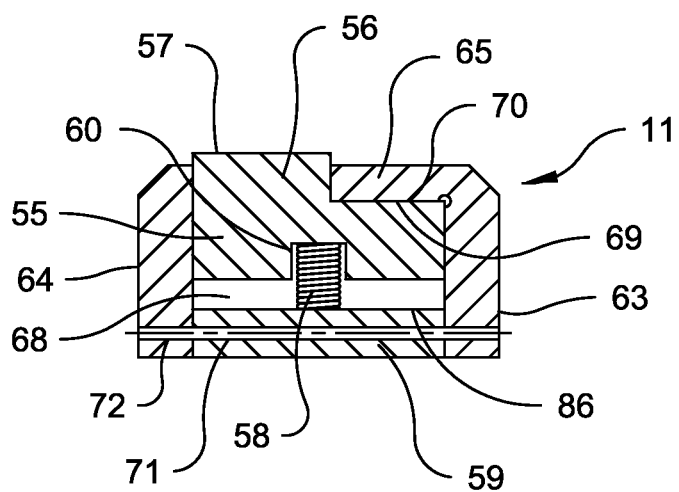
FIG. 14 is an enlarged cross-sectional view illustrating a seal assembly whereby a seal segment has a generally L-shaped cross section and a compression spring is partially recessed within the seal segment and contacts an outer radial surface along a spacer ring and an optional pin secures the spacer ring to a pair of end rings disposed about the seal segment in accordance with an embodiment of the invention.

Referring now to FIG. 14, a seal segment 57, an annular gap 68, and a spacer ring 59 are shown disposed between a pair of end rings 63, 64. The compression spring 58 is partially recessed within a cavity 60 along the seal segment 57. The spacer ring 59 and end rings 63, 64 could include an optional cavity 71 into which a roll pin 72 is inserted and secured to fix the spacer ring 59 to the end rings 63, 64. Two or more cavities 71 and roll pins 72 might be required to properly secure the spacer ring 59 to the end rings 63, 64.

Figure 15A:
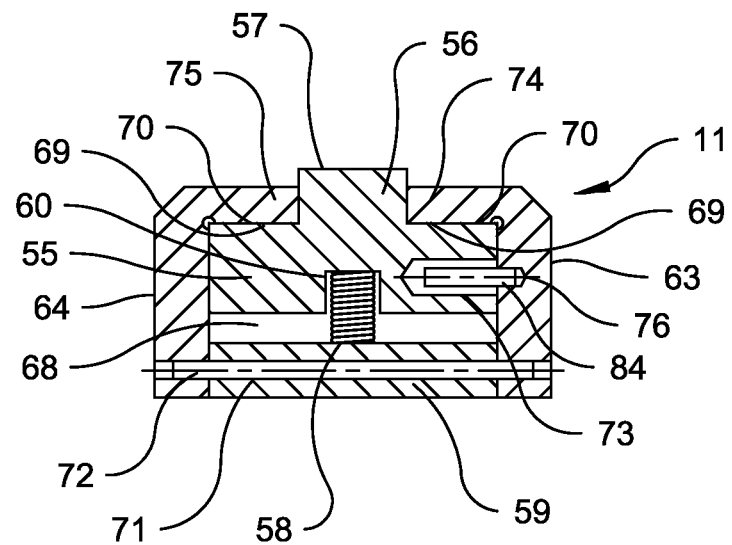
FIG. 15a is an enlarged cross-sectional view illustrating a seal assembly whereby a seal segment has a generally T-shaped cross section and a compression spring is partially recessed within the seal segment and contacts an outer radial surface along a spacer ring and a first optional pin secures the spacer ring to a pair of end rings and a second optional pin is secured at a first end to one end ring and at a second end resides within an oversize cavity along the seal segment in accordance with an embodiment of the invention.
Figure 15B:
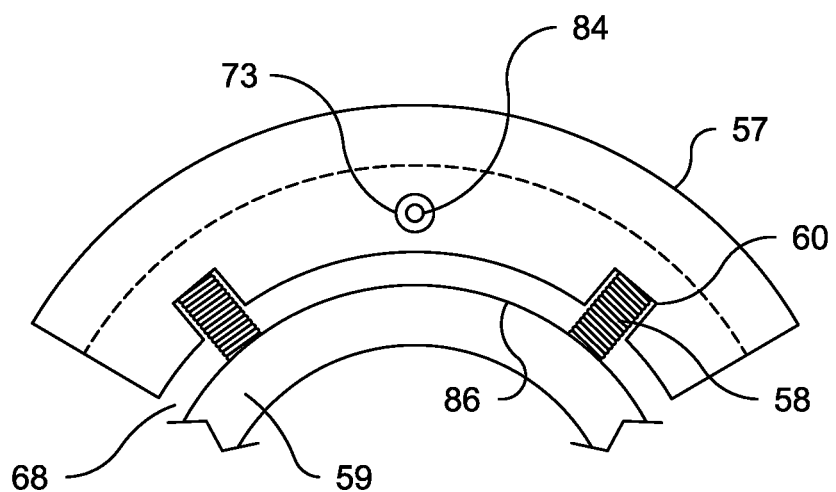
FIG. 15b is a cross-sectional elevation view of the embodiment in FIG. 15a illustrating a pair of compression springs partially recessed within the seal segment and contacting the outer radial surface along the spacer ring and the second optional pin is disposed within the oversized cavity within the seal segment in accordance with an embodiment of the invention.

Referring now to FIGS. 15a and 15b, an inverted "T"-shaped seal segment 57, annular gap 68, and spacer ring 59 are shown disposed between a pair of end rings 63, 64. The seal segment 57 is biased away from the spacer ring 59 and inner shaft 19 (not shown) via a compression spring 58 partially recessed within the seal segment 57. An optional roll pin 72 resides within a complementary shaped cavity 71 to secure the spacer ring 59 to the end rings 63, 64. An optional anti-rotation pin 84 is shown attached to one end to an end ring 63 immediately adjacent to the seal segment 57. The anti-rotation pin 84 could partially reside within a complementary shaped cavity 76 and is either mechanically or adhesively secured thereto. The second end of the anti-rotation pin 84 partially resides within a cavity 73 along one side of the seal segment 57. The cavity 73 could be dimensionally oversized for the anti-rotation pin 84 so as to avoid or minimize contact with the seal segment 57 during translations between the inner and outer shafts 19, 20 (not shown) which result in contact between the outer shaft 20 and seal segment 57. The distance between the depth of the cavity 73 and the length of the anti-rotation pin 84 residing with the cavity 73, when the seal segment 57 contacts the end ring 63, could be at least the maximum axial translation. In one example, the maximum axial translation could be equivalent to the difference between the width of the spacer ring 59 and width of the ring segment 55. The distance between the radius of the cavity 73 and the radius of the anti-rotation pin 84 could be at least the maximum radial translation. In one example, the maximum radial translation could the difference between the height of the compression spring 58 within the seal assembly 11 and the height of the compression spring 58 when fully compressed. In another example, the maximum radial translation could be the compression distance allowed for the compression spring 58 when less than the maximum compression allowable. While the compression spring 58 is shown equidistant between the vertical walls of the end rings 63, 64, it may be advantageous in certain applications to bias the spring toward one end ring 63 or 64 either to maximize the contact force between the upper radial surface 69 and the lower annular surface 70 or to minimize twist of the seal segment 57 within the seal assembly 11. However, the clearance between the anti-rotation pin 84 should allow the pin 84 to arrest rotation of the seal segment 57 with respect to the end ring 63. At least one anti-rotation pin 84 could be used with each seal segment 57.

Figure 16A:
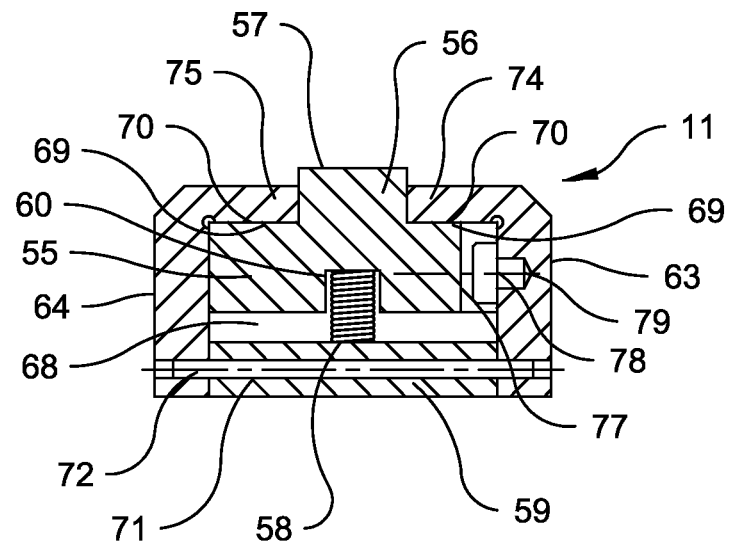
FIG. 16a is an enlarged cross-sectional view illustrating a seal assembly whereby a seal segment has a generally T-shaped cross section and a compression spring is partially recessed within the seal segment and contacts an outer radial surface along a spacer ring and a first optional pin secures the spacer ring to a pair of end rings disposed about the seal segment and a second optional pin at a first end is secured to one end ring and at a second end is disposed within a slot along the seal segment in accordance with an embodiment of the invention.
Figure 16B:
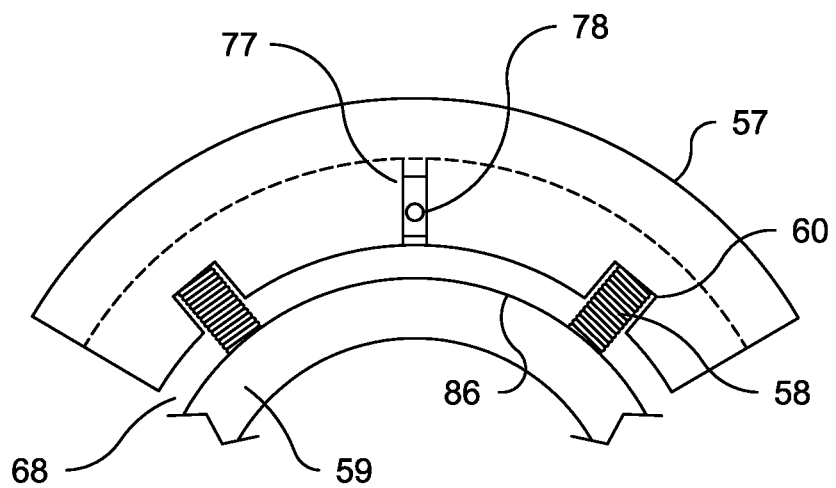
FIG. 16b is a cross-sectional elevation view of the embodiment in FIG. 16a illustrating a pair of compression springs partially recessed within the seal segment and contacting the outer radial surface of the spacer ring and the second optional pin is disposed within the slot oriented radially outward along the seal segment in accordance with an embodiment of the invention.

Referring now to FIGS. 16a and 16b, a seal assembly 11 is now shown having an optional second pin 78 attached along the interior of one end ring 63. A portion of the anti-rotation pin 78 resides within and is secured to a cavity 79 disposed along the end ring 63. In one example, the anti-rotation pin 78 could be a paddle pin having a head larger than the portion secured to the end ring 63. The ring segment 55 of the seal segment 57 could include a slot-shaped cavity 77 disposed in an outward radial orientation. The free end of the anti-rotation pin 78 would reside within the cavity 77. The width of the cavity 77 could be slightly larger than the major diameter of the anti-rotation pin 78 and the depth of the cavity 77 could be slightly deeper than the extension of the anti-rotation pin 78 so as to enable the anti-rotation pin 78 to freely move with respect to the cavity 77. The radial orientation and oversized width and depth of the slot-shaped cavity 77 would allow the seal segment 57 to freely translation without binding with respect to the anti-rotation pin 78. However, the clearance between the anti-rotation pin 78 should allow the pin 78 to arrest rotation of the seal segment 57 with respect to the end ring 63. At least one anti-rotation pin 78 could be used with each seal segment 57.

Figure 17A:
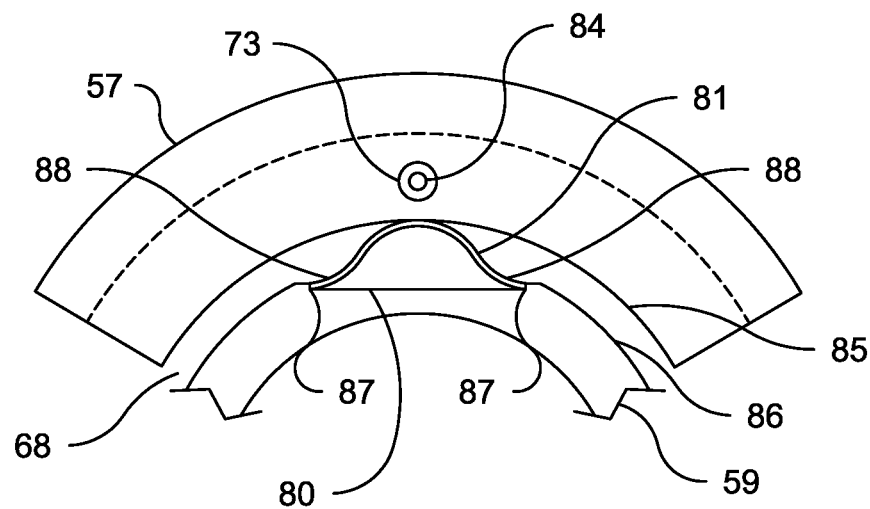
FIG. 17a is a cross-sectional elevation view illustrating a flat spring partially recessed within a spacer ring and contacting an inner radial surface along a seal segment and an optional pin disposed within an oversized cavity within the seal segment in accordance with an embodiment of the invention.
Figure 17B:
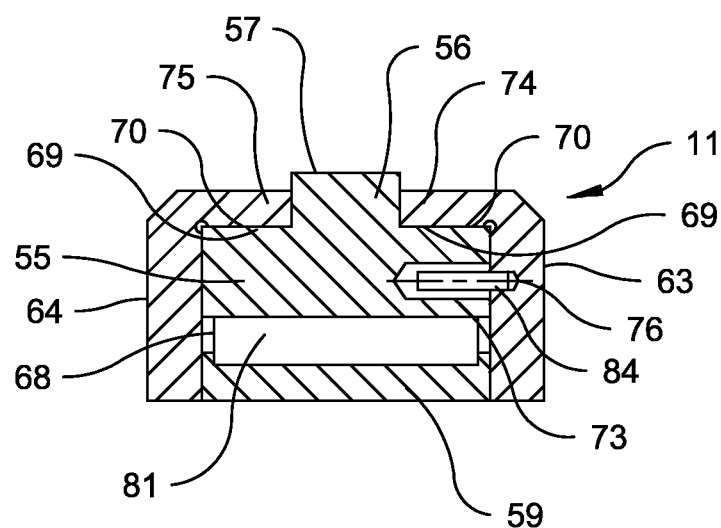
FIG. 17b is an enlarged cross-sectional view of the embodiment in FIG. 17a illustrating the seal segment with a generally T-shaped cross section and the flat spring is disposed between and contacts both the seal segment and the spacer ring and the optional pin at a first end is disposed within an oversized cavity along the seal segment and at a second end is secured to an end ring in accordance with an embodiment of the invention.

Referring now to FIGS. 17a and 17b, a seal segment 57, annular gap 68, and spacer ring 59 are shown disposed between a pair of end rings 63, 64. A resilient element or flat spring 81 is further disposed between and directly contacts the seal segment 57 along its inner radial surface 85 and spacer ring 59 along its outer annular surface 86. The flat spring 81 could be a strip of metal or other material capable of elastic deformation and recovery. While the flat spring 81 is shown having a generally U-shaped profile in FIG. 17a, other designs are possible including such non-limiting examples as a C-shaped or D-shaped profile. The flat spring 81 should bias the seal segment 57 away from the spacer ring 59 so as to enable contact between the upper radial surface 69 along the ring segment 55 and the lower annular surface 70 along the flange 74, 75 or 65. The flat spring 81 should also be sufficiently elastic and deformable so as to allow the seal segment 57 to move radially inward toward the spacer ring 59 when a contact force is applied onto the seal segment 57 by the outer shaft 20 (not shown). Also, the flat spring 81 should be sufficiently resilient so as to recover its original shape thereby reseating the seal segment 57 against the flanges 74, 75 or 65. At least one flat spring 81 could be used with each seal segment 57. This embodiment could further include the various features described herein including, but not limited to the anti-rotation pin 84 and cavities 73, 76.

The flat spring 81 could be partially recessed within a notch 80 along the outer annular surface 86 of the spacer ring 59. The notch 80 could include a pair of corners 87. The flat spring 81 could be positioned along the notch 80 so that the opposed ends 88 of the flat spring 81 separately contact the opposed corners 87, as represented in FIG. 17a. This arrangement localizes deflection to the central region of the flat spring 81 and increases the restorative forces exerted by the flat spring 81 onto the seal segment 57. In preferred embodiments, distance between the opposed corners 87 could be less than the distance between the ends 88 so that the flat spring 81 is at least slightly compressed when assembled onto the notch 80. The outward forces exerts at the ends 88 of the flat spring 81 onto the corners 87 would secure the flat spring 81 to the spacer ring 59.

Figure 18:
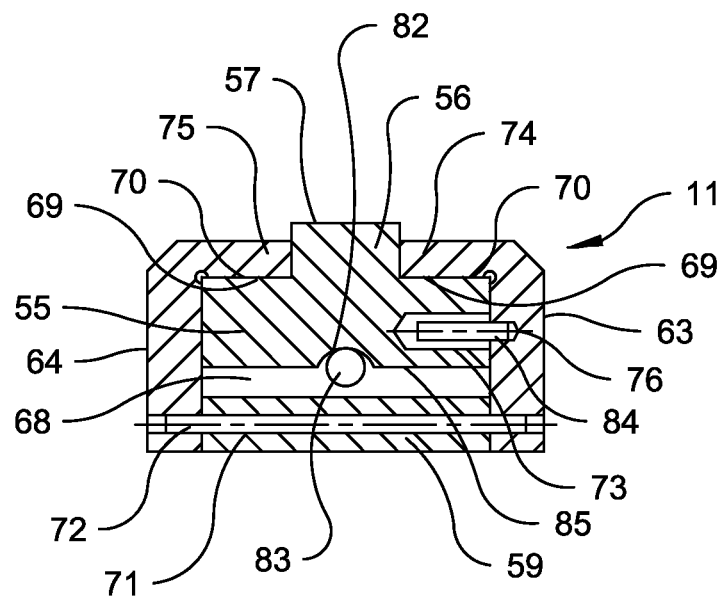
FIG. 18 is an enlarged cross-sectional view illustrating a seal assembly whereby a seal segment has a generally T-shaped cross section and an extension spring is partially recessed within the seal segment and a first optional pin secures a spacer ring to a pair of end rings disposed about the seal segment and a second optional pin at a first end is disposed within an oversized cavity along the seal segment and at a second end is secured to an end ring in accordance with an embodiment of the invention.
Figure 19:
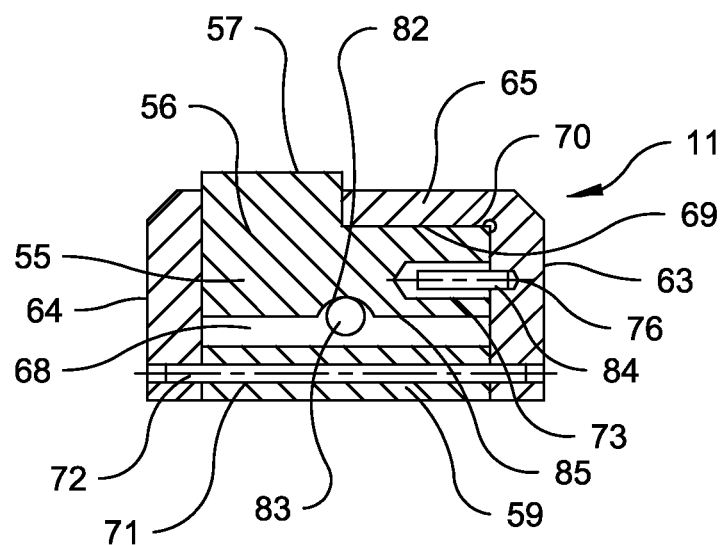
FIG. 19 is an enlarged cross-sectional view illustrating a seal assembly whereby a seal segment has a generally L-shaped cross section and an extension spring is partially recessed within the seal segment and a first optional pin secures a spacer ring to a pair of end rings disposed about the seal segment and a second optional pin at a first end is disposed within an oversized cavity along the seal segment and at a second end is secured to an end ring in accordance with an embodiment of the invention.

Referring now to FIGS. 18 and 19, a seal segment 57, annular gap 68, and spacer ring 59 are shown disposed between a pair of end rings 63, 64. A resilient element or extension spring 83 is further disposed between and directly contacts the seal segment 57 along its inner radial surface 85. In one example, the flat spring 81 could be a ring-shaped compression-type spring. The extension spring 83 should bias the seal segment 57 away from the spacer ring 59 so as to enable contact between the upper radial surface 69 along the ring segment 55 and the lower annular surface 70 along the flanges 74, 75 or 65. The extension spring 83 should also be sufficiently elastic and deformable so as to allow the seal segment 57 to move radially inward toward the spacer ring 59 when a contact force is applied onto the seal segment 57 by the outer shaft 20 (not shown). Finally, the extension spring 83 should be sufficiently resilient so as to recover its original shape thereby reseating the seal segment 57 against the flanges 74, 75 or 65. A single extension spring 83 contacts all seal segments 57. This embodiment could further include the various features described herein including, but not limited to the roll pin 72 and cavity 71 and anti-rotation pin 84 and cavities 73, 76.

In some embodiments, the extension spring 83 could be partially recessed within a groove 82 along the inner radial surface 85 of the seal segment 57. In other embodiments, the extension spring 83 could be fully recessed or embedded within the seal segments 57 along the annular seal element 54. In preferred embodiments, the extension spring 83 could have a diameter larger than the inner diameter of the annular seal element 54 so that the extension spring 83 is at least slightly compressed when assembled onto the groove 82. The resultant outward forces exerted by the extension spring 83 would secure the spring 83 to each seal segment 57 along the annular seal element 54. The resultant outward forces would seat the seal segments 57 onto the flanges 74, 75 or 65.

The description above indicates that a great degree of flexibility is offered in terms of the present invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. A segmented intershaft seal assembly for use between an inner shaft and an outer shaft disposed about a common axis within a turbine engine comprising:
   (a) a pair of end rings with at least one said end ring having a flange disposed along and extending from one side of said end ring, each said flange has a lower annular surface;
   (b) an annular seal element formed by at least two seal segments, each said seal segment includes a ring segment and a ring flange segment, said ring segment has an upper radial surface, said ring flange segment disposed along and extending from said upper radial surface to form either a substantially "T"-shaped cross section or a substantially "L"-shaped cross section, said seal segments disposed between said end rings;
   (c) a spacer ring disposed between said end rings, said spacer ring disposed about and directly contacts said inner shaft;
   (d) an annular gap disposed between said spacer ring and said annular seal element; and
   (e) a plurality of resilient elements which completely traverse said annular gap, a first end of each said resilient element contacts said spacer ring, a second end of each said resilient element contacts said annular seal element, each said resilient element partially recessed within said annular seal element or said spacer ring, at least one said resilient element biases each said seal segment toward a sealing surface along said outer shaft so that said upper radial surface directly contacts said lower annular surface and a portion of said ring flange segment extends beyond said flange in direction of said outer shaft, said resilient elements separately minimize a clearance between each said seal segment and said sealing surface, a relief disposed circumferentially along said lower annular surface where said flange extends from said end ring.

2. The segmented intershaft seal assembly of claim 1, wherein each said resilient element is a compression spring disposed radially outward between said inner shaft and said outer shaft.

3. The segmented intershaft seal assembly of claim 2, further comprising:
   (f) a pin secured to said spacer ring adjacent to each said seal segment, said pin resides within an oversized cavity along said seal segment, said pin physically separated from said seal segment within said oversized cavity by a gap.

4. The segmented intershaft seal assembly of claim 2, wherein said spacer ring is secured to said end rings.

5. The segmented intershaft seal assembly of claim 2, further comprising:
   (f) a pin secured to one said end ring adjacent to each said seal segment, said pin partially resides within a cavity shaped or sized to form a gap physically separating said pin from said seal segment.

6. The segmented intershaft seal assembly of claim 1, wherein each said resilient element is a flat spring, each said flat spring partially recessed within a notch along said spacer ring, each said notch includes a pair of opposed corners, said flat spring positioned within said notch so that a pair of opposed ends along said flat spring separately contact said opposed corners.

7. The segmented intershaft seal assembly of claim 6, further comprising:
   (f) a pin secured to said spacer ring adjacent to each said seal segment, said pin resides within an oversized cavity along said seal segment, said pin physically separated from said seal segment within said oversized cavity by a gap.

8. The segmented intershaft seal assembly of claim 6, wherein said spacer ring is secured to said end rings.

9. The segmented intershaft seal assembly of claim 6, further comprising:
   (f) a pin secured to one said end ring adjacent to each said seal segment, said pin partially resides within a cavity shaped or sized to form a gap physically separating said pin from said seal segment.

10. The segmented intershaft seal assembly of claim 1, wherein each said ring flange segment has a shaped surface adjacent to said outer shaft.

11. The segmented intershaft seal assembly of claim 1, further comprising:

(f) a locking nut directly contacting one said end ring to secure said seal assembly to said inner shaft.

12. The segmented intershaft seal assembly of claim 1, wherein
said seal segments are composed of a metal, a metal alloy, or carbon,
said end rings, said inner shaft, and said outer shaft have substantially similar thermal expansion properties to minimize contact between said seal segments and said outer shaft.

13. A segmented intershaft seal assembly for use between an inner shaft and an outer shaft disposed about a common axis within a turbine engine comprising:
(a) a pair of end rings with at least one said end ring having a flange disposed along and extending from one side of said end ring, each said flange has a lower annular surface;
(b) an annular seal element formed by at least two seal segments, each said seal segment includes a ring segment and a ring flange segment, said ring segment has an upper radial surface, said ring flange segment disposed along and extending from said upper radial surface to form either a substantially "T"-shaped cross section or a substantially "L"-shaped cross section, said seal segments disposed between said end rings;
(c) a spacer ring disposed between said end rings, said spacer ring disposed about and directly contacts said inner shaft;
(d) an annular gap disposed between said spacer ring and said annular seal element; and
(e) an extension spring partially recessed within a groove along said seal segments between said annular seal element and said spacer ring, said extension spring biases each said seal segment toward a sealing surface along said outer shaft so that said upper radial surface directly contacts said lower annular surface and a portion of said ring flange segment extends beyond said flange in direction of said outer shaft, said extension spring minimizes a clearance between each said seal segment and said sealing surface, a relief disposed circumferentially along said lower annular surface where said flange extends from said end ring.

14. A segmented intershaft seal assembly for use between an inner shaft and an outer shaft disposed about a common axis within a turbine engine comprising:
(a) a pair of end rings with at least one said end ring having a flange disposed along and extending from one side of said end ring, each said flange has a lower annular surface;
(b) an annular seal element formed by at least two seal segments, each said seal segment includes a ring segment and a ring flange segment, said ring segment has an upper radial surface, said ring flange segment disposed along and extending from said upper radial surface to form either a substantially "T"-shaped cross section or a substantially "L"-shaped cross section, said seal segments disposed between said end rings;
(c) a spacer ring disposed between said end rings, said spacer ring disposed about and directly contacts said inner shaft;
(d) an annular gap disposed between said spacer ring and said annular seal element; and
(e) a plurality of flat springs disposed between said annular seal element and said spacer ring, each said flat spring partially recessed within a notch disposed along a circumferential surface of said spacer ring, each said notch includes a pair of opposed corners, a pair of opposed ends along said flat spring separately contact said opposed corners, a middle portion of each said flat spring contacts one said seal segment, each said flat spring oriented to deflect inward and outward along a plane through said common axis and perpendicular to said spacer ring and said annular seal element, said flat springs bias said seal segments toward a sealing surface along said outer shaft so that said upper radial surface directly contacts said lower annular surface and a portion of said ring flange segment extends beyond said flange in direction of said outer shaft, said flat springs separately minimize a clearance between each said seal segment and said sealing surface along said outer shaft.

15. The segmented intershaft seal assembly of claim 14, further comprising:
(f) a pin secured to said spacer ring adjacent to each said seal segment, said pin resides within an oversized cavity along said seal segment, said pin physically separated from said seal segment within said oversized cavity by a gap.

16. The segmented intershaft seal assembly of claim 14, wherein said spacer ring is secured to said end rings.

17. The segmented intershaft seal assembly of claim 14, further comprising:
(f) a pin secured to one said end ring adjacent to each said seal segment, said pin partially resides within a cavity shaped or sized to form a gap physically separating said pin from one said seal segment.

18. A segmented intershaft seal assembly for use between an inner shaft and an outer shaft disposed about a common axis within a turbine engine comprising:
(a) a pair of end rings with at least one said end ring having a flange disposed along and extending from one side of said end ring, each said flange has a lower annular surface;
(b) an annular seal element formed by at least two seal segments, each said seal segment includes a ring segment and a ring flange segment, said ring segment has an upper radial surface, said ring flange segment disposed along and extending from said upper radial surface to form either a substantially "T"-shaped cross section or a substantially "L"-shaped cross section, said seal segments disposed between said end rings;
(c) a spacer ring disposed between said end rings, said spacer ring disposed about and directly contacts said inner shaft;
(d) an annular gap disposed between said spacer ring and said annular seal element;
(e) a plurality of resilient elements which completely traverse said annular gap, a first end of each said resilient element contacts said spacer ring, a second end of each said resilient element contacts said annular seal element, at least one said resilient element biases each said seal segment toward a sealing surface along said outer shaft so that said upper radial surface directly contacts said lower annular surface and a portion of said ring flange segment extends beyond said flange in direction of said outer shaft, said resilient elements separately minimize a clearance between each said seal segment and said sealing surface; and
(f) a pin secured to one said spacer ring adjacent to each said seal segment, said pin resides within an oversized cavity along said seal segment, said pin physically separated from said seal segment within said oversized cavity by a gap, said pin radially aligned with said resilient element when one said resilient element contacts said seal segment or disposed substantially equidistant from two said resilient elements when two said resilient elements contact said seal segment.

19. The segmented intershaft seal assembly of claim 18, wherein said spacer ring is secured to said end rings.

20. The segmented intershaft seal assembly of claim 18, further comprising:
   (g) a pin secured to one said end ring adjacent to each said seal segment, said pin partially resides within a cavity shaped or sized to form a gap physically separating said pin from said seal segment.

21. The segmented intershaft seal assembly of claim 13, further comprising:
   (f) a pin secured to said spacer ring adjacent to each said seal segment, said pin resides within an oversized cavity along said seal segment, said pin physically separated from said seal segment within said oversized cavity by a gap.

22. The segmented intershaft seal assembly of claim 13, wherein said spacer ring is secured to said end rings.

23. The segmented intershaft seal assembly of claim 13, further comprising:
   (f) a pin secured to one said end ring adjacent to each said seal segment, said pin partially resides within a cavity shaped or sized to form a gap physically separating said pin from said seal segment.

* * * * *